US011017100B2

(12) United States Patent
Krishnamoorthy et al.

(10) Patent No.: US 11,017,100 B2
(45) Date of Patent: May 25, 2021

(54) IDENTITY FRAUD RISK ENGINE PLATFORM

(71) Applicant: Verizon Patent and Licensing Inc., Arlington, VA (US)

(72) Inventors: Manian Krishnamoorthy, Derry, NH (US); Venkat Korvi, Winchester, MA (US); Mannar Naga Sai Karyampudi, San Jose, CA (US); Ying Chen, Cambridge, MA (US); Praveen Atreya, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 200 days.

(21) Appl. No.: 16/054,316

(22) Filed: Aug. 3, 2018

(65) Prior Publication Data

US 2020/0042723 A1    Feb. 6, 2020

(51) Int. Cl.
*G06F 21/60* (2013.01)
*G06F 21/31* (2013.01)
*G06F 21/62* (2013.01)
*G06F 21/40* (2013.01)

(52) U.S. Cl.
CPC .......... *G06F 21/604* (2013.01); *G06F 21/316* (2013.01); *G06F 21/40* (2013.01); *G06F 21/6218* (2013.01)

(58) Field of Classification Search
CPC .. G06F 21/604; G06F 21/316; G06F 21/6218; G06F 21/40
USPC ........................................................ 726/27
See application file for complete search history.

(56) References Cited

U.S. PATENT DOCUMENTS

| | | | | |
|---|---|---|---|---|
| 8,584,219 | B1* | 11/2013 | Toole | G06F 21/60 |
| | | | | 726/25 |
| 8,806,610 | B2* | 8/2014 | Draluk | G06F 21/31 |
| | | | | 726/16 |
| 8,925,058 | B1* | 12/2014 | Dotan | G06F 21/31 |
| | | | | 713/186 |
| 9,111,083 | B2* | 8/2015 | Taveau | G06Q 20/12 |
| 9,202,038 | B1* | 12/2015 | Allen | G06F 21/40 |
| 9,349,014 | B1* | 5/2016 | Hubing | G06F 21/577 |
| 9,424,429 | B1* | 8/2016 | Roth | G06F 21/45 |
| 9,426,139 | B1* | 8/2016 | McClintock | H04L 63/102 |
| 9,430,629 | B1* | 8/2016 | Ziraknejad | G06F 16/51 |

(Continued)

OTHER PUBLICATIONS

NPL Search Terms (Year: 2021).*

*Primary Examiner* — Syed A Zaidi

(57) ABSTRACT

A risk assessment platform receives an indication of a first user authentication event associated with a user's attempt to access a first protected resource, and collects first user and device attributes associated with a first authentication process applied to the user and the user's device. The risk assessment platform receives an indication of a second user authentication event associated with the user's attempt to access a second protected resource, and collects second user and device attributes associated with a second authentication process applied to the user and the user's device. The risk assessment platform determines a level of risk of identity fraud associated with the user based on the first and second user and device attributes, and grants or denies the user access to the second protected resource based on the determined level of risk of identity fraud associated with the user.

20 Claims, 15 Drawing Sheets

(56) References Cited

U.S. PATENT DOCUMENTS

| | | | |
|---|---|---|---|
| 9,444,824 B1* | 9/2016 | Balazs | H04L 63/08 |
| 9,560,030 B2* | 1/2017 | Hughes | H04L 63/08 |
| 9,560,046 B2* | 1/2017 | Hughes | G06F 21/6245 |
| 9,667,613 B1* | 5/2017 | Wisemon | H04L 63/08 |
| 9,769,192 B2* | 9/2017 | Tucker | H04L 63/1433 |
| 9,801,066 B1* | 10/2017 | Hanley | G06Q 20/405 |
| 9,807,094 B1* | 10/2017 | Liu | H04L 63/10 |
| 9,842,220 B1* | 12/2017 | Brisebois | G06F 21/6218 |
| 9,887,984 B2* | 2/2018 | Justin | H04L 63/0823 |
| 9,967,742 B1* | 5/2018 | Belton, Jr. | H04W 12/0609 |
| 10,003,607 B1* | 6/2018 | Kolman | H04L 63/0272 |
| 10,032,039 B1* | 7/2018 | Milman | H04L 51/12 |
| 10,091,230 B1* | 10/2018 | Machani | H04L 63/1433 |
| 10,097,527 B2* | 10/2018 | Brown | G06F 21/629 |
| 10,115,111 B2* | 10/2018 | Miltonberger | G06Q 10/067 |
| 10,158,489 B2* | 12/2018 | Shastri | H04L 9/3231 |
| 10,218,506 B1* | 2/2019 | Bhabbur | G06F 3/0304 |
| 10,303,869 B1* | 5/2019 | Duke | G06F 21/36 |
| 10,313,353 B2* | 6/2019 | Lu | G06Q 20/4014 |
| 10,360,367 B1* | 7/2019 | Mossoba | G06F 3/0673 |
| 10,440,028 B1* | 10/2019 | Makmel | H04L 63/08 |
| 10,484,429 B1* | 11/2019 | Fawcett | H04L 63/20 |
| 10,491,623 B2* | 11/2019 | Foster | H04L 63/102 |
| 10,496,801 B2* | 12/2019 | Hamlin | G06F 21/34 |
| 10,601,937 B2* | 3/2020 | Holzband | H04L 51/16 |
| 10,606,990 B2* | 3/2020 | Tuli | G06F 21/552 |
| 10,606,994 B2* | 3/2020 | Kurian | H04L 63/0861 |
| 10,609,037 B2* | 3/2020 | Jackson | H04L 63/1408 |
| 10,614,452 B2* | 4/2020 | Tomasofsky | G06Q 20/3674 |
| 10,616,196 B1* | 4/2020 | Khitrenovich | G06N 20/00 |
| 10,616,221 B2* | 4/2020 | Favila | H04L 63/0876 |
| 10,873,596 B1* | 12/2020 | Bourget | G06N 20/00 |
| 2005/0097320 A1* | 5/2005 | Golan | G06F 21/40 713/166 |
| 2006/0282660 A1* | 12/2006 | Varghese | G06Q 20/341 713/155 |
| 2008/0046368 A1* | 2/2008 | Tidwell | G06Q 20/40 705/44 |
| 2008/0098464 A1* | 4/2008 | Mizrah | G06F 21/36 726/5 |
| 2009/0089869 A1* | 4/2009 | Varghese | G06Q 20/4016 726/7 |
| 2009/0144095 A1* | 6/2009 | Shahi | G06Q 40/08 705/4 |
| 2009/0199264 A1* | 8/2009 | Lang | G06F 21/31 726/1 |
| 2011/0047265 A1* | 2/2011 | Withers | G06F 21/316 709/224 |
| 2011/0225625 A1* | 9/2011 | Wolfson | H04L 63/08 726/1 |
| 2011/0246766 A1* | 10/2011 | Orsini | G06F 11/1076 713/160 |
| 2011/0277025 A1* | 11/2011 | Counterman | G06F 21/40 726/8 |
| 2011/0307957 A1* | 12/2011 | Barcelo | G06F 21/552 726/25 |
| 2011/0314558 A1* | 12/2011 | Song | G06F 21/316 726/28 |
| 2012/0072723 A1* | 3/2012 | Orsini | G06F 21/6209 713/165 |
| 2012/0143650 A1* | 6/2012 | Crowley | H04L 41/28 705/7.28 |
| 2012/0166818 A1* | 6/2012 | Orsini | H04L 9/085 713/193 |
| 2013/0013931 A1* | 1/2013 | O'Hare | G06F 21/606 713/189 |
| 2013/0046987 A1* | 2/2013 | Radhakrishnan | H04L 63/105 713/172 |
| 2013/0047213 A1* | 2/2013 | Radhakrishnan | H04L 63/0807 726/4 |
| 2013/0047224 A1* | 2/2013 | Radhakrishnan | G06F 21/33 726/6 |
| 2013/0047249 A1* | 2/2013 | Radhakrishnan | H04L 63/0807 726/12 |
| 2013/0047254 A1* | 2/2013 | Radhakrishnan | G06F 21/335 726/22 |
| 2013/0047263 A1* | 2/2013 | Radhakrishnan | H04L 63/0807 726/27 |
| 2013/0047266 A1* | 2/2013 | Radhakrishnan | H04L 63/0807 726/28 |
| 2013/0061285 A1* | 3/2013 | Donfried | G06F 21/316 726/3 |
| 2013/0109358 A1* | 5/2013 | Balasubramaniyan | H04L 65/1076 455/411 |
| 2013/0298244 A1* | 11/2013 | Kumar | G06F 21/52 726/25 |
| 2013/0312115 A1* | 11/2013 | Jennings | G06F 21/62 726/28 |
| 2013/0346311 A1* | 12/2013 | Boding | G06Q 20/3227 705/44 |
| 2014/0007179 A1* | 1/2014 | Moore | G06F 21/316 726/1 |
| 2014/0164178 A1* | 6/2014 | Adjaoute | G06Q 30/0609 705/26.35 |
| 2014/0282868 A1* | 9/2014 | Sheller | G06F 21/31 726/3 |
| 2014/0289833 A1* | 9/2014 | Briceno | H04L 63/08 726/7 |
| 2015/0039513 A1* | 2/2015 | Adjaoute | G06Q 20/4016 705/44 |
| 2015/0088739 A1* | 3/2015 | Desai | G06Q 20/322 705/42 |
| 2015/0106265 A1* | 4/2015 | Stubblefield | G06Q 50/265 705/44 |
| 2015/0112871 A1* | 4/2015 | Kumnick | G06Q 20/382 705/67 |
| 2015/0188913 A1* | 7/2015 | Teixeron | H04W 12/12 713/155 |
| 2015/0205954 A1* | 7/2015 | Jou | G06F 21/316 726/22 |
| 2015/0220907 A1* | 8/2015 | Denton | G06Q 20/322 705/44 |
| 2015/0363481 A1* | 12/2015 | Haynes | G06Q 10/10 707/748 |
| 2016/0012235 A1* | 1/2016 | Lee | G06Q 10/0635 726/25 |
| 2016/0063229 A1* | 3/2016 | Key | G06F 21/316 726/1 |
| 2016/0099963 A1* | 4/2016 | Mahaffey | H04L 63/145 726/25 |
| 2016/0110528 A1* | 4/2016 | Gupta | G06F 21/31 726/19 |
| 2016/0180068 A1* | 6/2016 | Das | G06F 21/32 726/7 |
| 2016/0203575 A1* | 7/2016 | Madhu | H04L 63/1483 705/319 |
| 2016/0212100 A1* | 7/2016 | Banerjee | H04L 63/0281 |
| 2016/0226911 A1* | 8/2016 | Boss | H04L 63/083 |
| 2016/0269403 A1* | 9/2016 | Koutenaei | H04L 63/0861 |
| 2017/0006028 A1* | 1/2017 | Tunnell | G06Q 20/322 |
| 2017/0070524 A1* | 3/2017 | Bailey | H04L 43/12 |
| 2017/0118025 A1* | 4/2017 | Shastri | H04L 9/3234 |
| 2017/0206365 A1* | 7/2017 | Garcia | G06F 21/6245 |
| 2017/0230417 A1* | 8/2017 | Amar | H04L 63/20 |
| 2017/0243028 A1* | 8/2017 | LaFever | G06F 21/6254 |
| 2017/0264619 A1* | 9/2017 | Narayanaswamy | H04L 63/0281 |
| 2017/0289168 A1* | 10/2017 | Bar | G06F 21/316 |
| 2017/0332238 A1* | 11/2017 | Bansal | H04L 63/0281 |
| 2017/0364450 A1* | 12/2017 | Struttmann | H04L 63/123 |
| 2017/0364698 A1* | 12/2017 | Goldfarb | G06F 21/6218 |
| 2017/0364699 A1* | 12/2017 | Goldfarb | H04L 9/3239 |
| 2017/0364700 A1* | 12/2017 | Goldfarb | G06F 21/64 |
| 2017/0364701 A1* | 12/2017 | Struttmann | G06F 21/78 |
| 2017/0366353 A1* | 12/2017 | Struttmann | G06F 21/64 |
| 2018/0012227 A1* | 1/2018 | Tunnell | G06Q 20/40145 |

(56) References Cited

U.S. PATENT DOCUMENTS

| | | | |
|---|---|---|---|
| 2018/0025148 A1* | 1/2018 | Jain | G06F 21/34 |
| | | | 713/166 |
| 2018/0027006 A1* | 1/2018 | Zimmermann | G06F 9/46 |
| | | | 726/11 |
| 2018/0032744 A1* | 2/2018 | Cavanaugh | G06F 21/62 |
| 2018/0033006 A1* | 2/2018 | Goldman | G06Q 20/405 |
| 2018/0034859 A1* | 2/2018 | Aronowitz | H04L 63/205 |
| 2018/0039990 A1* | 2/2018 | Lindemann | G06F 21/31 |
| 2018/0041503 A1* | 2/2018 | Lindemann | H04L 63/0435 |
| 2018/0048647 A1* | 2/2018 | Favila | H04W 4/70 |
| 2018/0063128 A1* | 3/2018 | Korus | H04L 63/083 |
| 2018/0069867 A1* | 3/2018 | Grajek | H04L 63/102 |
| 2018/0082069 A1* | 3/2018 | Cunico | H04L 63/0227 |
| 2018/0089403 A1* | 3/2018 | Watson | H04L 63/08 |
| 2018/0159852 A1* | 6/2018 | Crabtree | H04L 63/0876 |
| 2018/0181741 A1* | 6/2018 | Whaley | G06F 21/316 |
| 2018/0183789 A1* | 6/2018 | Tischart | H04L 63/08 |
| 2018/0186334 A1* | 7/2018 | Munafo | G06N 3/0427 |
| 2018/0191501 A1* | 7/2018 | Lindemann | H04L 9/3231 |
| 2018/0191695 A1* | 7/2018 | Lindemann | H04L 63/0853 |
| 2018/0205552 A1* | 7/2018 | Struttmann | G06F 16/9024 |
| 2018/0211115 A1* | 7/2018 | Klein | G08B 25/10 |
| 2018/0227303 A1* | 8/2018 | Caldera | G06F 21/316 |
| 2018/0247312 A1* | 8/2018 | Loganathan | G06Q 20/32 |
| 2018/0248863 A1* | 8/2018 | Kao | H04L 63/08 |
| 2018/0288060 A1* | 10/2018 | Jackson | H04L 63/102 |
| 2018/0288063 A1* | 10/2018 | Koottayi | G06F 21/552 |
| 2018/0288073 A1* | 10/2018 | Hopper | G06Q 20/4016 |
| 2018/0293367 A1* | 10/2018 | Urman | H04L 67/12 |
| 2018/0307857 A1* | 10/2018 | Beecham | H04L 9/3239 |
| 2018/0307859 A1* | 10/2018 | LaFever | H04L 63/0407 |
| 2018/0341758 A1* | 11/2018 | Park | G06F 21/316 |
| 2018/0343246 A1* | 11/2018 | Benayed | G06F 21/41 |
| 2018/0351944 A1* | 12/2018 | Cho | H04L 63/0838 |
| 2018/0357423 A1* | 12/2018 | Kurian | G06F 21/60 |
| 2019/0012441 A1* | 1/2019 | Tuli | G06F 21/577 |
| 2019/0028514 A1* | 1/2019 | Barboi | H04L 63/0807 |
| 2019/0036969 A1* | 1/2019 | Swafford | G06F 11/3072 |
| 2019/0043054 A1* | 2/2019 | Crank | G06Q 20/405 |
| 2019/0044942 A1* | 2/2019 | Gordon | H03M 1/12 |
| 2019/0081968 A1* | 3/2019 | Wang | G06F 21/50 |
| 2019/0116193 A1* | 4/2019 | Wang | H04L 63/08 |
| 2019/0123904 A1* | 4/2019 | Ackerman | H04L 63/0236 |
| 2019/0141041 A1* | 5/2019 | Bhabbur | H04L 9/0643 |
| 2019/0147152 A1* | 5/2019 | Kurian | G06F 21/31 |
| | | | 382/118 |
| 2019/0149542 A1* | 5/2019 | Scopis | G06K 9/00315 |
| | | | 726/7 |
| 2019/0158503 A1* | 5/2019 | Bansal | H04L 63/0823 |
| 2019/0164156 A1* | 5/2019 | Lindemann | H04L 9/0877 |
| 2019/0171801 A1* | 6/2019 | Barday | G06F 21/316 |
| 2019/0180208 A1* | 6/2019 | Nelson | G06F 16/904 |
| 2019/0182115 A1* | 6/2019 | Wilshinsky | G06F 3/0605 |
| 2019/0199759 A1* | 6/2019 | Anderson | G06Q 10/063118 |
| 2019/0222424 A1* | 7/2019 | Lindemann | H04L 63/0861 |
| 2019/0236249 A1* | 8/2019 | Pavlou | G06F 21/554 |
| 2019/0253269 A1* | 8/2019 | Keane | H04L 63/20 |
| 2019/0253431 A1* | 8/2019 | Atanda | G06F 21/62 |
| 2019/0266609 A1* | 8/2019 | Phelan | G06Q 20/3224 |
| 2019/0273746 A1* | 9/2019 | Coffing | H04L 63/0807 |
| 2019/0281030 A1* | 9/2019 | Isaacson | H04W 4/80 |
| 2019/0288850 A1* | 9/2019 | Beecham | G06F 21/64 |
| 2019/0291696 A1* | 9/2019 | Munafo | B60R 25/30 |
| 2019/0295085 A1* | 9/2019 | Ashiya | G06N 20/00 |
| 2019/0318117 A1* | 10/2019 | Beecham | G06F 16/9024 |
| 2019/0319980 A1* | 10/2019 | Levy | G06F 16/137 |
| 2019/0325432 A1* | 10/2019 | Ow | G06Q 20/3672 |
| 2019/0327081 A1* | 10/2019 | Ow | H04L 63/0428 |
| 2019/0327082 A1* | 10/2019 | Ow | H04L 9/3226 |
| 2019/0332807 A1* | 10/2019 | LaFever | G06F 21/6254 |
| 2019/0340379 A1* | 11/2019 | Beecham | G06F 16/9024 |
| 2019/0349351 A1* | 11/2019 | Verma | H04L 63/30 |
| 2019/0373136 A1* | 12/2019 | Diaz | G06F 21/32 |
| 2019/0384899 A1* | 12/2019 | Brannon | G06F 21/6245 |
| 2020/0004938 A1* | 1/2020 | Brannon | G06F 21/316 |
| 2020/0005168 A1* | 1/2020 | Bhargava | G06K 9/6215 |
| 2020/0021620 A1* | 1/2020 | Purathepparambil | |
| | | | H04L 63/105 |
| 2020/0026871 A1* | 1/2020 | Mikhailov | G06F 16/258 |
| 2020/0044851 A1* | 2/2020 | Everson | G06Q 20/4016 |
| 2020/0077265 A1* | 3/2020 | Singh | G06F 21/57 |
| 2020/0175141 A1* | 6/2020 | Manganelli | H04L 63/08 |
| 2020/0210899 A1* | 7/2020 | Guo | G06K 9/6256 |

* cited by examiner

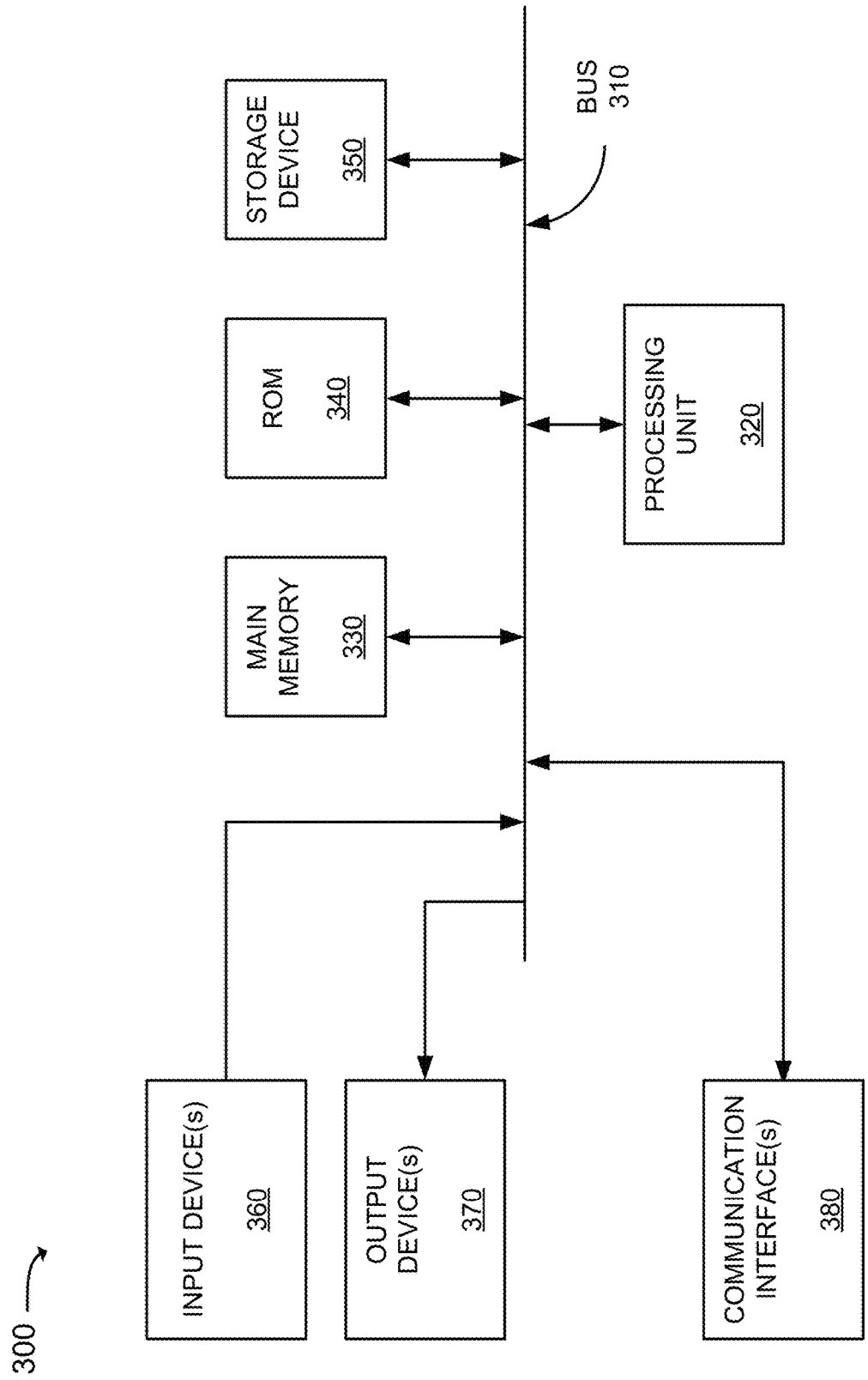

IDENTITY FRAUD RISK ENGINE PLATFORM

BACKGROUND

To access a protected network resource, such as stored data (e.g., cloud data) or a network service, a user typically must supply user access credentials (e.g., login credentials). The network service provider, or application server, through which the user accesses the protected network resource, associates the credentials of the user with an identity of the user. Cybercriminals, however, have developed techniques for hacking user credentials, and fraudulently obtaining access to protected network resources associated with the user identity of other users.

BRIEF DESCRIPTION OF THE DRAWINGS

FIG. 3 is a diagram that depicts exemplary components of a device that corresponds to each of the devices, the risk assessment platform, and/or the app servers of FIG. 1;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

As described herein, a risk assessment platform assesses a level of risk of identity fraud associated with users attempting to access protected resources, such as, for example, stored data (e.g., cloud data) or network services. The risk assessment platform monitors static, dynamic or multi-factor authentication processes engaged in by a user, and collects and stores user and/or device attributes associated with the authentication processes. The risk assessment platform then performs a risk score calculation process to determine a level of risk of identity fraud associated with the user based on the collected user and/or device attributes. The determined risk score for the user may be used by the risk assessment platform, or other application servers, for granting or denying the user access to protected resources.

Figure 1:
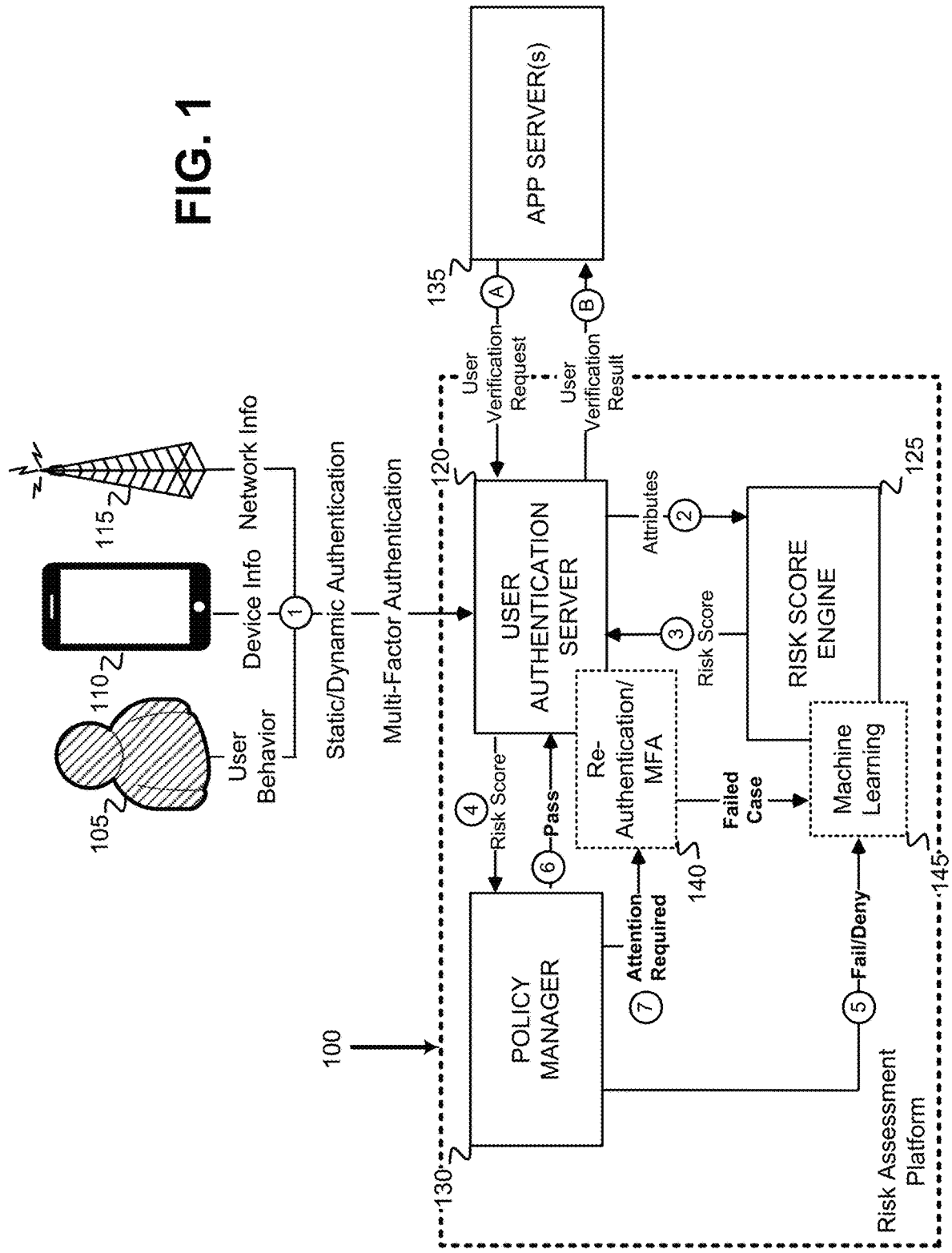
FIG. 1 depicts an exemplary overview of an implementation of a risk assessment platform that identifies level of risk of identity fraud associated with users accessing protected digital resources.

FIG. 1 depicts an exemplary overview of an implementation of a risk assessment platform 100 that identifies a level of risk of identity fraud associated with users accessing protected digital resources. As shown in FIG. 1, an authentication server(s) 120 of the risk assessment platform 100 obtains and collects attributes/information (identified with a "1" within a circle) associated with a user 105 engaging in static/dynamic authentication and/or multi-factor authentication for accessing protected digital resources, wherein the attributes/information may include data associated with behavior of the user (i.e., user behavior attributes), information associated with the user 105 engaging in authentication (i.e., user information attributes), information associated with the device 110 that the user 100 is using (i.e., device information attributes), and/or network information associated with the user 105's access of a network 115 via the device 110 (i.e., network information attributes).

Static authentication may include execution of an authentication process that verifies the identity of the user 105 without performing any computations. One example of a static authentication process includes a user 105 supplying login credentials (e.g., login ID and/or password) that is compared to known login credentials to verify the identity of the user 105. Dynamic authentication may include execution of an authentication process that verifies the identity of the user 105 by performing dynamic computations. Various different types of existing dynamic authentication processes may be used. One example of a dynamic authentication process includes a challenge-response protocol in which a challenge is sent to the user, and the user's device 110 responds by computing a cryptographic function that uses the challenge and secret data (e.g., a secret key) stored at the device. The challenge-response protocol may be based on, for example, a digital signature computing algorithm. Multi-factor (MF) authentication may include execution of an authentication protocol that verifies the identity of the user 105 by obtaining two or more pieces of evidence (or factors) and subjecting them to an authentication mechanism. An example of two-factor authentication includes verifying a user 105's identity by using something the user 105 knows (e.g., a password) and a second factor, such as the user 105 repeating something that was sent to them through an out-of-band mechanism (e.g., a verification code sent to the user 105 via an email).

The user information attributes of the collected attributes may include data associated with the user 105, or with an account of the user 105. The user information attributes may include, for example, an account profile or a settings profile of an account of the user 105, account information associated with the user 105 (e.g., name, address, phone number, email address, billing address, service address, account age, privacy settings, payment information, etc. of the user 105's account), and/or biometric information associated with the user 105 (e.g., a "selfie" picture, a fingerprint, an audio file of user 105 speaking). The user behavior attributes of the collected attributes may include, for example, actions taken by the user 105 during the static, dynamic, and/or multi-factor authentication. The actions may include, for example, input actions taken by user 105 upon device 110, and/or on-line actions taken by user 105 via device 110 (e.g., as evidenced by signaling sent from device 110). The device information attributes of the collected attributes may include information associated with the device 110 such as, for example, device profile data, Mobile Directory Number (MDN), International Mobile Subscriber Identity (IMSI), Subscriber Identity Module (SIM) ID, International Mobile Equipment Identifier (IMEI), Mobile Equipment Identifier (MEID), device operational characteristics, device activity, device location (e.g., GPS coordinates), etc. The network information attributes of the collected attributes may include, for example, a network address (e.g., Internet Protocol (IP) address, Port address, Medium Access Control (MAC) address, etc.) of device 110 used by user 105 for performing the static, dynamic, and/or multi-factor authentication.

Subsequent to collection of the attributes/information associated with a user 105 engaging in the static, dynamic authentication, and/or multi-factor authentication, the authentication server 120 passes the collected attributes (identified with a "2" within a circle) to a risk score engine 125 of risk assessment platform 100. Risk score engine 125 uses a process for determining a risk score, that identifies a level of risk of identity fraud, associated with user 105 attempting to access protected digital resources, based on the collected attributes. The risk score, therefore, represents a score that serves as a proxy for identifying whether or not the user 105 is likely to be the user/person/entity that user 105 is claiming to be when attempting to access digital resources. The risk score determination process, in one implementation, may calculate a weighted sum associated with the collected attributes to determine a risk score associated with user 105, as described in further detail below. Risk score engine 125 may, in one implementation, include a machine learning system that uses a Bayesian computation set for determining the risk score for each user 105. Upon determination of the current risk score for user 105, risk score engine 125 passes the risk score (identified with a "3" within a circle) to authentication server(s) 120 which, in turn, passes the risk score (identified with a "4" within a circle) to policy manager 130.

Policy manager 130, upon receipt of the risk score associated with a user 105, compares the risk score with a policy threshold score or policy score range, previously set by, for example, an administrator, to determine whether the risk score indicates a risk failure, a risk passage, or an "attention required" state. A risk failure/denial (identified with a "5" within a circle) indicates that the determined risk score for the user 105 is too high, and that the attempt to access protected digital resources should be denied. The denial of the access attempt should be reported by policy manager 130 to a machine learning process/function 145 of risk score engine 125. A risk passage (identified with a "6" within a circle) indicates that the determined risk score for the user 105 is sufficiently low, and that the attempt to access protected digital resources should be granted. An "attention required" state (identified with a "7" within a circle) indicates that the determined risk score for the user 105 is ambiguous (i.e., neither too high nor too low), and that a further security measure(s) may be applied to the user 105's attempt to access the protected digital resources. The further security measure(s) may include triggering a re-authentication process 140, such as, for example, step-up authentication or multi-factor authentication, for user 105 by authentication server(s) 120. Completion of the extra security measure(s) by authentication server(s) 120 results in a denial or grant of access to the protected digital resource based on the results of the extra security measure. If completion of the extra security measure results in a denial of access, the failed case is reported to the machine learning process 145 of risk score engine 125.

As further shown in the exemplary overview of FIG. 1, an app server 135 may desire to verify whether a risk of identity fraud exists with respect to a particular user, such as user 105. For example, the user 105, via device 110, may be accessing data at, or requesting a network service from, app server 135, and the app server 135, prior to allowing such access or providing the network service, may desire to verify the possibility of identity fraud with respect to the user 105. App server 135 may, therefore, send a user verification request (identified with an "A" within a circle) to authentication server(s) 120 that includes data that may be used by authentication server(s) 120 to identify the user 105 whom app server 135 desires to verify the possibility of identity fraud.

Upon receipt of the user verification request, authentication server(s) 120 may retrieve a most recent determined risk score associated with the user 105, or may determine a completely new risk score for the user 105 based on previously collected attributes, and may return a user verification result (identified with a "B" within a circle) to the requesting app server 135 that includes an indication of the identity fraud risk to app server 135 via a user verification result. The indication of identity fraud risk may be a quantitative or qualitative indication of the likelihood that the user 105 is not the person/user/entity that the user 105 is claiming to be.

Figure 2:
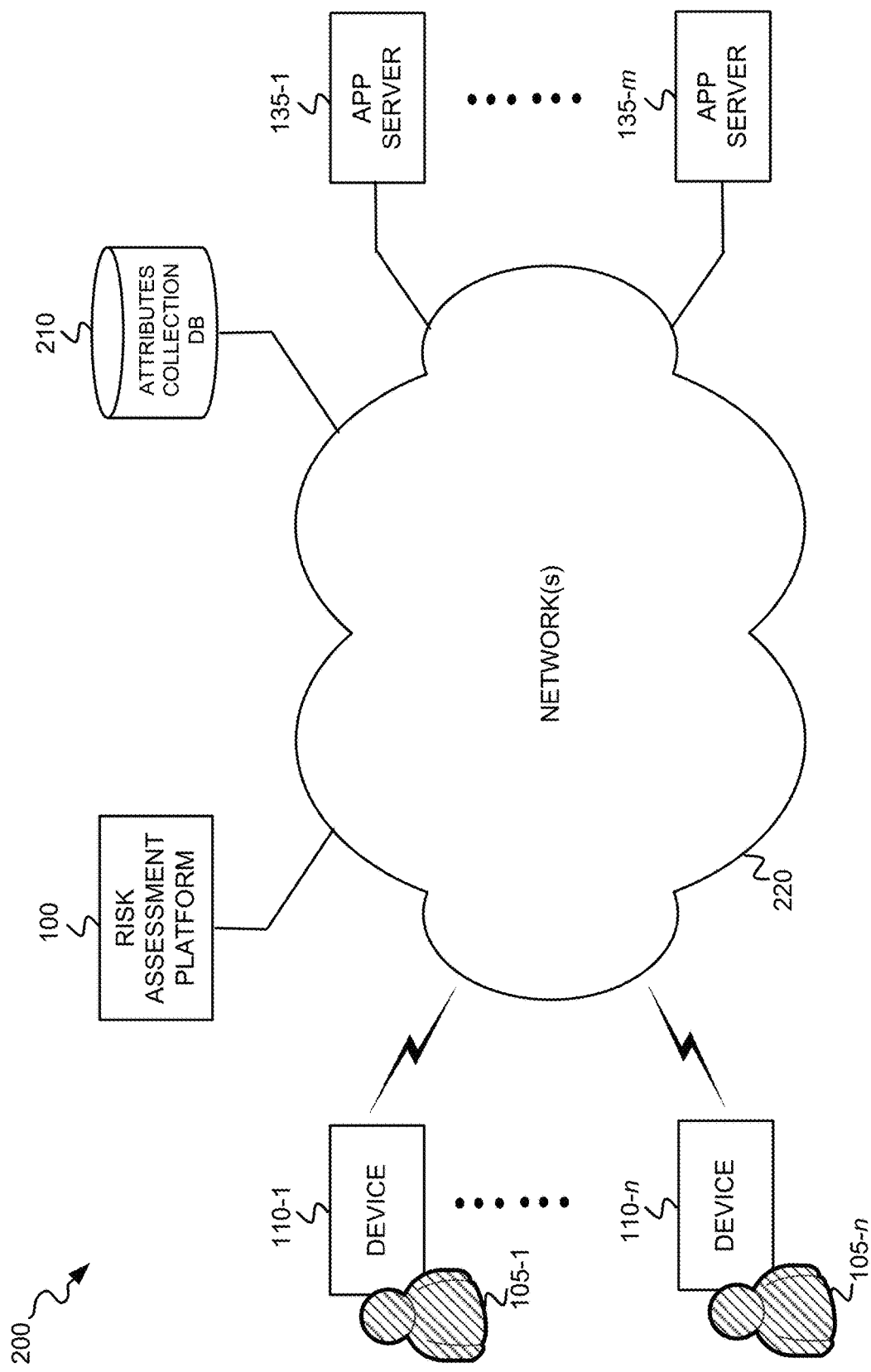
FIG. 2 depicts an exemplary network environment in which the risk assessment platform of FIG. 1 identifies the risks of fraud associated with various users that use devices to attempt to access a protected digital resource.

FIG. 2 depicts an exemplary network environment 200 in which risk assessment platform 100 identifies the risks of identity fraud associated with various users 105 that use devices 110 to attempt to access protected resources (e.g., digital resources, such as data stored at an app server 135, or a network service provided by an app server 135). As shown, network environment 200 may include risk assessment platform 100, devices 110-1 through 110-*n* (where n is greater than or equal to one), an attributes collection database (DB) 210, app servers 135-1 through 135-*m* (where m is greater than or equal to one, and where m may, or may not, equal n), and network(s) 220.

Risk assessment platform 100 includes one or more network devices that implement the user authentication server 120, the risk score engine 125, and the policy manager 130 of FIG. 1. Devices 110-1 through 110-*n* (generically referred to herein as "devices 110" or "device 110") may each include any type of device that communicates over network(s) 220 via a wired or wireless connection. For example, each of devices 110 may include a mobile telephone (e.g., a smart phone), a client or server network device, a personal digital assistant (PDA), or a computer (e.g., laptop, tablet, palmtop, or wearable computer). A user 105 may be associated with each device 110, where the user may include a permanent or temporary owner, operator, or administrator of the device 110. Attributes collection DB 210 includes one or more network devices that each includes a memory device(s) that stores attributes collected by user authentication server 120 of risk assessment platform 100. App servers 135-1 through 135-*m* (generically referred to herein as "app servers 135" or "app server 135") may each include one or more network devices that store particular data, and/or provide a particular network service to users 105 via devices 110 and network(s) 220.

Network(s) 220 may include one or more wired or wireless networks of various types including, for example, one or more wired telecommunications networks (e.g., Public Switched Telephone Networks (PSTNs)), one or more wireless networks (e.g., a Public Land Mobile Network(s) (PLMN(s)), a satellite network(s)), the Internet, a wired and/or wireless local area network (LAN), a wired and/or wireless wide area network (WAN), a wired and/or wireless metropolitan area network (MAN), an intranet, or a cable network (e.g., an optical cable network).

The configuration of network components of network environment 200 is shown in FIG. 2 is for illustrative purposes. Other configurations may be implemented. Therefore, network environment 200 may include additional, fewer and/or different components that may be configured in a different arrangement than that depicted in FIG. 2.

FIG. 3 is a diagram that depicts exemplary components of a device 300. Devices 110, risk assessment platform 100, and app servers 135 may each include one or more devices that may be configured the same as, or similar to, device 300 (possibly with some variations in components or configuration). Device 300 may include a bus 310, a processing unit 320, a main memory 330, a read only memory (ROM) 340, a storage device 350, an input device(s) 360, an output device(s) 370, and a communication interface(s) 380. Bus 310 may include a path that permits communication (e.g., electrical or optical) among the components of device 300.

Processing unit 320 may include one or more processors or microprocessors which may interpret and execute stored instructions associated with one or more processes, or processing logic that implements the one or more processes. In some implementations, processing unit 320 may include, but is not limited to, programmable logic such as Field Programmable Gate Arrays (FPGAs) or accelerators. Processing unit 320 may include software, hardware, or a combination of software and hardware, for executing the processes described herein. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium" or "non-transitory storage medium." The processes/methods set forth herein can, in some implementations, be implemented as instructions that are stored in main memory 330, ROM 340 and/or storage device 350 for execution by processing unit 320.

Input device 360 may include one or more mechanisms that permit an operator to input information into device 300, such as, for example, a keypad or a keyboard, a display with a touch sensitive screen or panel, voice recognition and/or biometric mechanisms, etc. Output device 370 may include one or more mechanisms that output information to the operator, including a display, a speaker, etc. Input device 360 and output device 370 may, in some implementations, be implemented as a user interface (UI) (e.g., a touch screen display) that displays UI information and which receives user input via the UI. Communication interface(s) 380 may include a transceiver that enables device 300 to communicate with other devices and/or systems. For example, communication interface(s) 380 may include a wired or wireless transceiver(s) for communicating via network(s) 220.

The configuration of components of device 300 illustrated in FIG. 3 is for illustrative purposes. Other configurations may be implemented. Therefore, device 300 may include additional, fewer and/or different components than those depicted in FIG. 3.

Figure 4A:
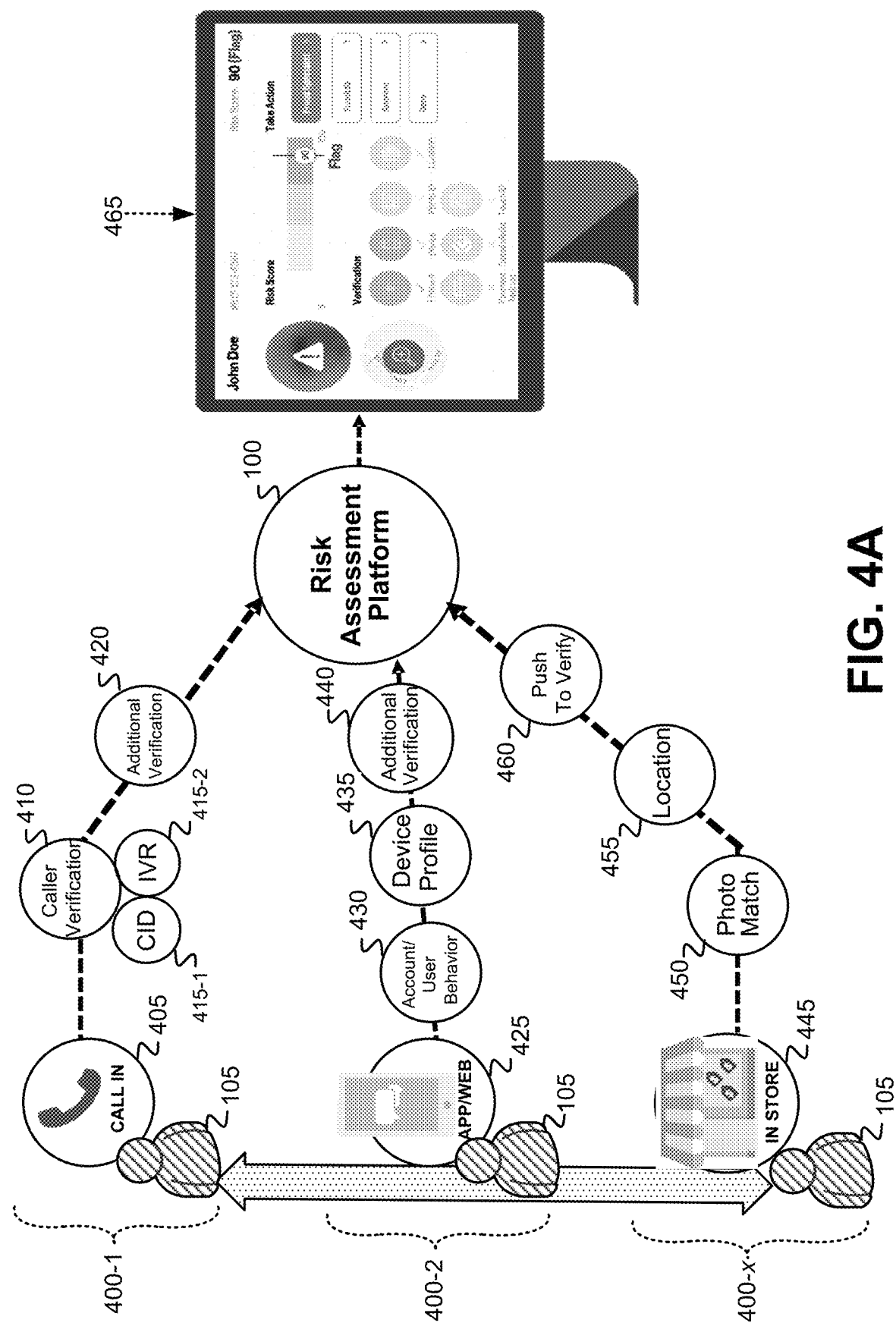
FIG. 4A depicts examples of the collection of attributes associated with a user engaging in static, dynamic, or multi-factor authentication while attempting to access protected resources.

FIG. 4A depicts examples of the collection of attributes associated with a user 105 engaging in static, dynamic, or multi-factor authentication while attempting to access protected resources. As shown in FIG. 4A, attributes may be collected in association with multiple different types of user authentication processes 400-1 through 400-x (three are shown by way of example). In a first authentication process 400-1, a user 105 may call in to an automatic or manual call center using device 110 via a PSTN or PLMN. During authentication process 400-1, caller verification 410 of user 105 may be performed that may include, for example, identifying the caller using caller identification (CID) 415-1 or identifying the caller using interactive voice response (IVR) 415-2. Additional caller verification processes 420, other than those already described, may be performed for verifying the identity of the caller calling in to the call center, such as, for example, performing caller identity recognition based on voice analysis of the caller's voice. The attributes collected from the caller verification authentication process 400-1 applied to user 105 may be supplied to risk assessment platform 100.

In a second authentication process 400-2, the user 105 may use an application (app), or web browser, to log into an on-line account or network service. The network device(s) receiving the user log in, may, during authentication, collect attributes such as account/user behavior 430, a device profile 435, or additional verification 440 attributes. Account/user behavior 430 may include attributes associated with the user 105's on-line activity or behavior while logging into, or while logged into, the account or network service. Device profile 435 may include attributes associated with the device 110 that user 105 uses to log into the account or network service. The additional user verification attributes 440 may include additional attributes, other than those already described, that may be obtained during verification of the identity of the user that has logged into the account or network service. The attributes collected from the account/network service login authentication process 400-2 may be supplied to risk assessment platform 100.

In another authentication process 400-x, the user 105 may physically present themselves, in person, at a "brick and mortar" store to, for example, purchase a product or service, or to obtain assistance with a malfunctioning product. While in the store, a photo match process 450 may be performed, and a location 455 of user 105's device 110 may be determined as matching the location of the store. The photo match process may, in one instance, include manual comparison, by a store employee, of the user 105's picture ID with a previously stored image of the user 105. In another instance, the photo match process may include using an image scanning system to scan the user 105's picture ID, and the image scanning system may compare the scanned picture of the user 105 with a previously stored image of the user 105. Additionally, a "push to verify" (also called "touch ID" herein) process 460 may be initiated by which a pop-up message is sent to the user 105's device 110, requesting that the user 105 push a button on the device 110 to verify receipt of the message. Pushing of the button upon the user 105's device may, in itself, be used as a verification of the identity of user 105. In other implementations, when the button is pushed by the user 105 upon the device 110 (e.g., with a particular finger), a biometric scan of the user 105's fingerprint may be taken via the touch screen of the device 110. The scanned fingerprint may then be used for verification of the identity of the user 105 such as by comparison with a previously stored biometric scan of the user 105's fingerprint.

As further shown in FIG. 4A, a risk assessment user interface 465 may be presented, by risk assessment platform 100, to a risk assessment operator or administrator (not shown) via a computational device (e.g., a desktop, laptop, palmtop, or tablet computer, or smart phone) connected to risk assessment platform 100. The risk assessment user interface 465 may display a risk assessment score determined by risk assessment platform 100 for quantifying a level of risk of identity fraud associated with user 105.

Figure 4B:
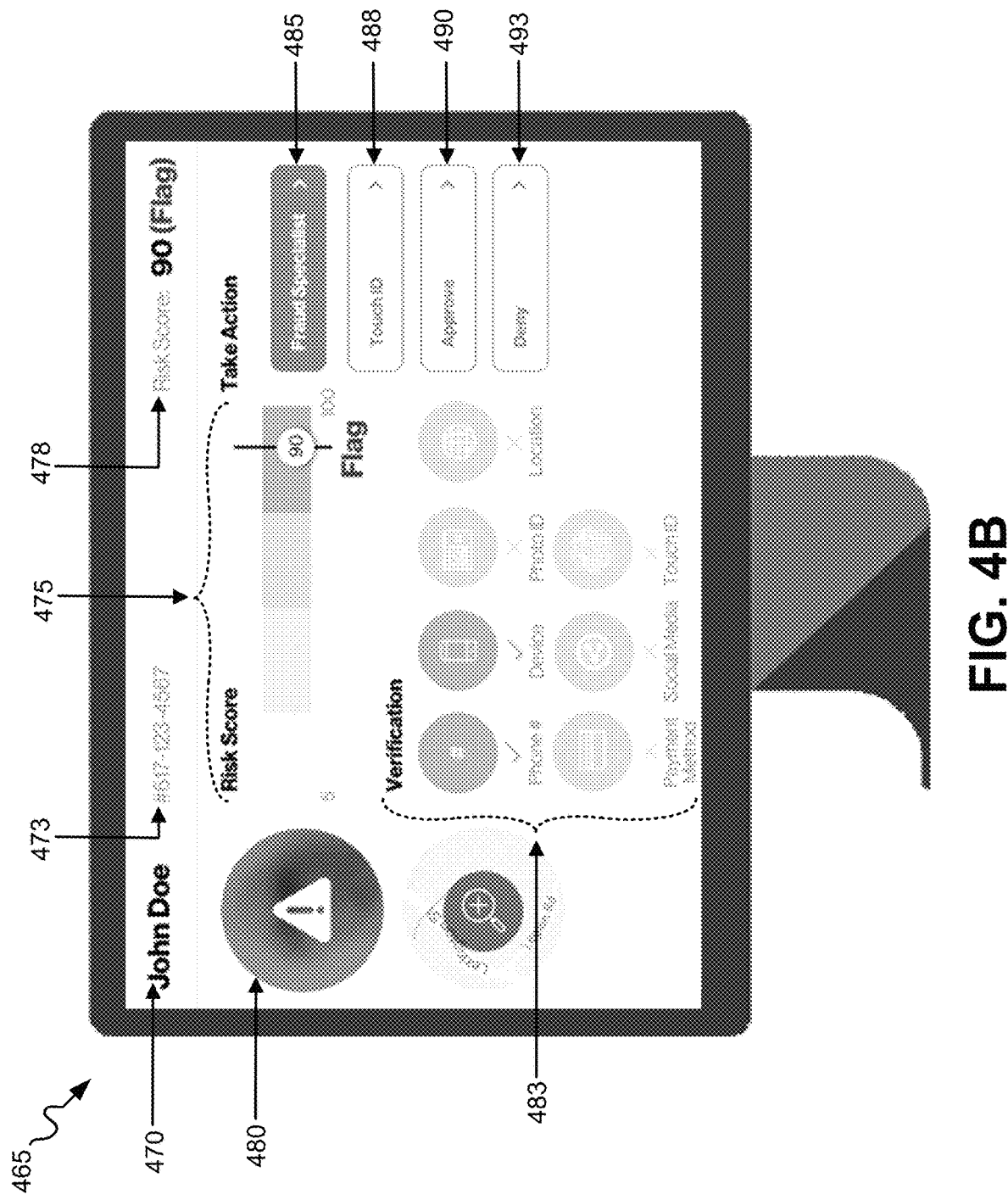
FIG. 4B depicts an exemplary user interface that displays a risk assessment score generated by the risk assessment platform of FIG. 1 for quantifying an amount of risk of identity fraud associated with a particular.

FIG. 4B depicts further details, according to one exemplary implementation, of the risk assessment user interface 465. User interface 465 may display a user 105's name 470, and a phone number 473 (e.g., MDN) associated with the device 110 of the user 105. User interface 465 may additionally display icons 483 associated with the types of attributes used by risk assessment platform 100 in determining a risk of identity fraud associated with the user 105 identified by the user name 470. A highlighted icon indicates that that particular type of attribute was obtained and used in the risk assessment determination. A non-highlighted icon indicates that that particular type of attribute was not obtained or was not used in the risk assessment determination.

Various types of attribute icons may be displayed in user interface 465, including, for example, a phone number icon, a device icon, a photo ID icon, a location icon, a payment method icon, a social media icon, and a touch ID icon. A highlighted phone number icon indicates that a phone number of the device 110 which the user 105 is currently using matches the phone number as being on-record for that user 105. A highlighted device icon indicates that the device information, obtained from the network providing service to the user 105's device 110, matches device information of the device 110 known to be used by the user 105. A highlighted photo ID icon indicates that the user 105 has presented a photo ID that matches the known identity of the user 105. A highlighted location icon indicates that a location of the user 105 matches a determined location of the device 110 known to be used by the user 105. The location of the device 110 may be determined using, for example, Global Positioning System (GPS) data obtained from GPS. A highlighted payment method icon indicates that the user 105 has attempted to use a payment method known to be associated with the user 105 (e.g., a particular credit card number, with a particular security code obtained from the back of the credit card). A highlighted social media icon indicates that the user 105's information provided during the current transaction matches known social media information. A highlighted touch ID icon indicates that the touch ID process, described further below with respect to FIGS. 8A and 8B, has been initiated and passed by the user 105.

User interface 465 may further display a risk score 478, including an associated risk score scale 475, and a flag 480 indication indicating whether or not a high risk of identity fraud is predicted for the user identified by name 470 and phone number 473. The risk score 478, and the risk score scale 475, present a quantified number (e.g., scaled between 0 and 100) that indicates a level of risk of identity fraud associated with the user 105 based on the collected attributes. For example, in some implementations, a higher risk score may indicate a higher risk of identity fraud, whereas a lower risk score may indicate a lower risk of identity fraud.

The determined risk score may be compared, by risk assessment platform 100, with a risk policy threshold (e.g., set by an operator or administrator) to determine whether the risk score is higher or lower than the risk policy threshold. If, for example, if the risk score is higher than the risk policy threshold, then the flag 480 may be set (i.e., indicating an unacceptable level of risk of identity fraud) and displayed in user interface 465.

User interface 465 may additionally present "take action" option buttons to the operator or administrator, including a button 485 for referring the user 105 to a fraud specialist, a button 488 for initiating a "touch ID" process (described below with respect to FIGS. 8A and 8B), a button 490 for manually approving a resource access attempt by the user 105 identified by name 470 and phone number 473 (i.e., possibly manually overriding any denial taken based on the determined risk score for that user 105), and a button 493 for denying a resource access attempt by the user 105 identified by name 470 and phone number 473 (i.e., possibly manually overriding any approval taken based on the determined risk score for that user 105). The administrator viewing user interface 465, as deemed necessary, may select one of the "take action" option buttons 485, 488, 490, or 493 with respect to a particular user 105 identified by name 470.

Figure 5A:
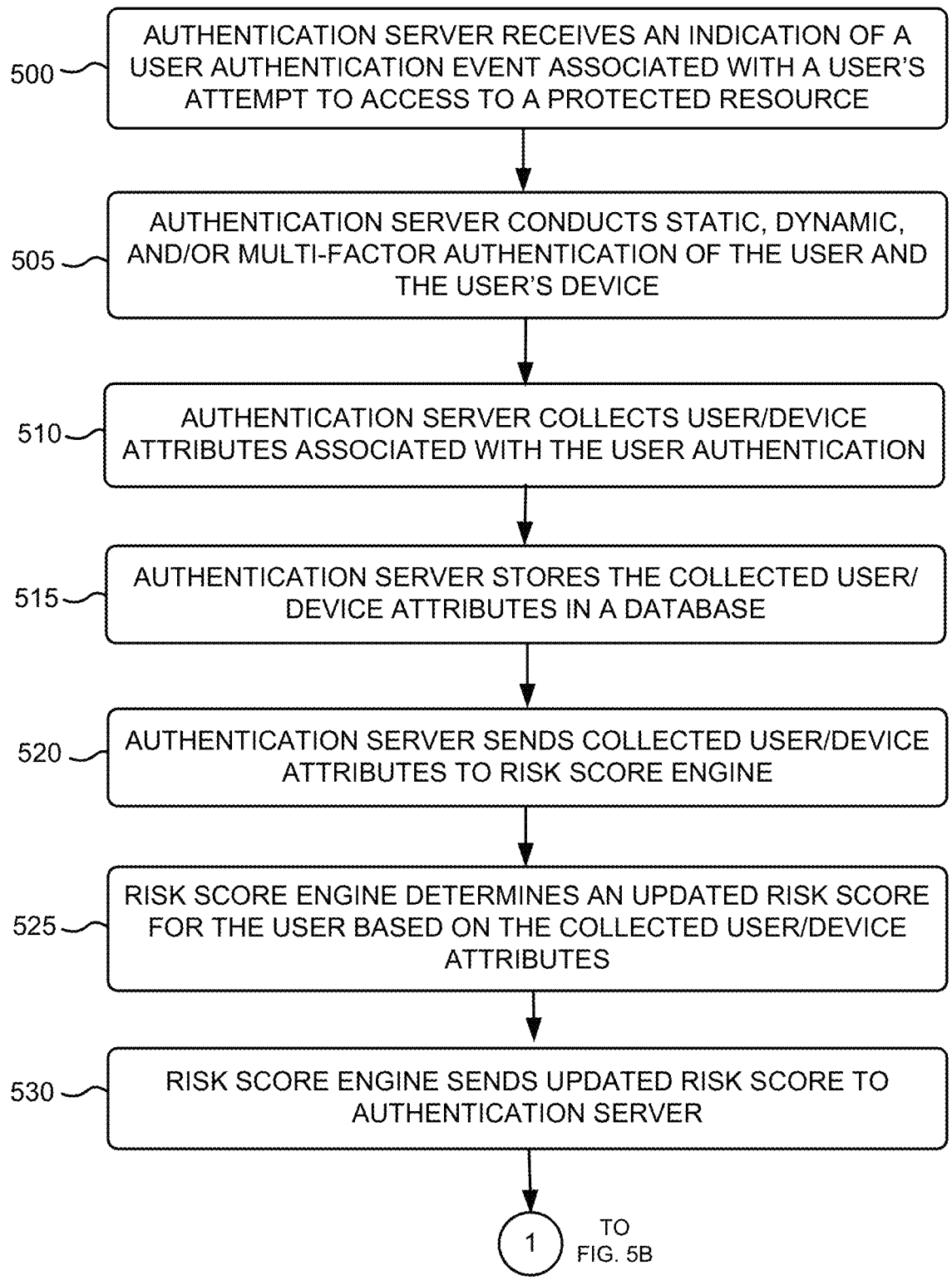
FIGS. 5A-5C are flow diagrams of an exemplary process for performing an assessment of identify fraud of a user based on the user engaging in one or more authentication processes for attempting to access a protected resource.
Figure 5B:
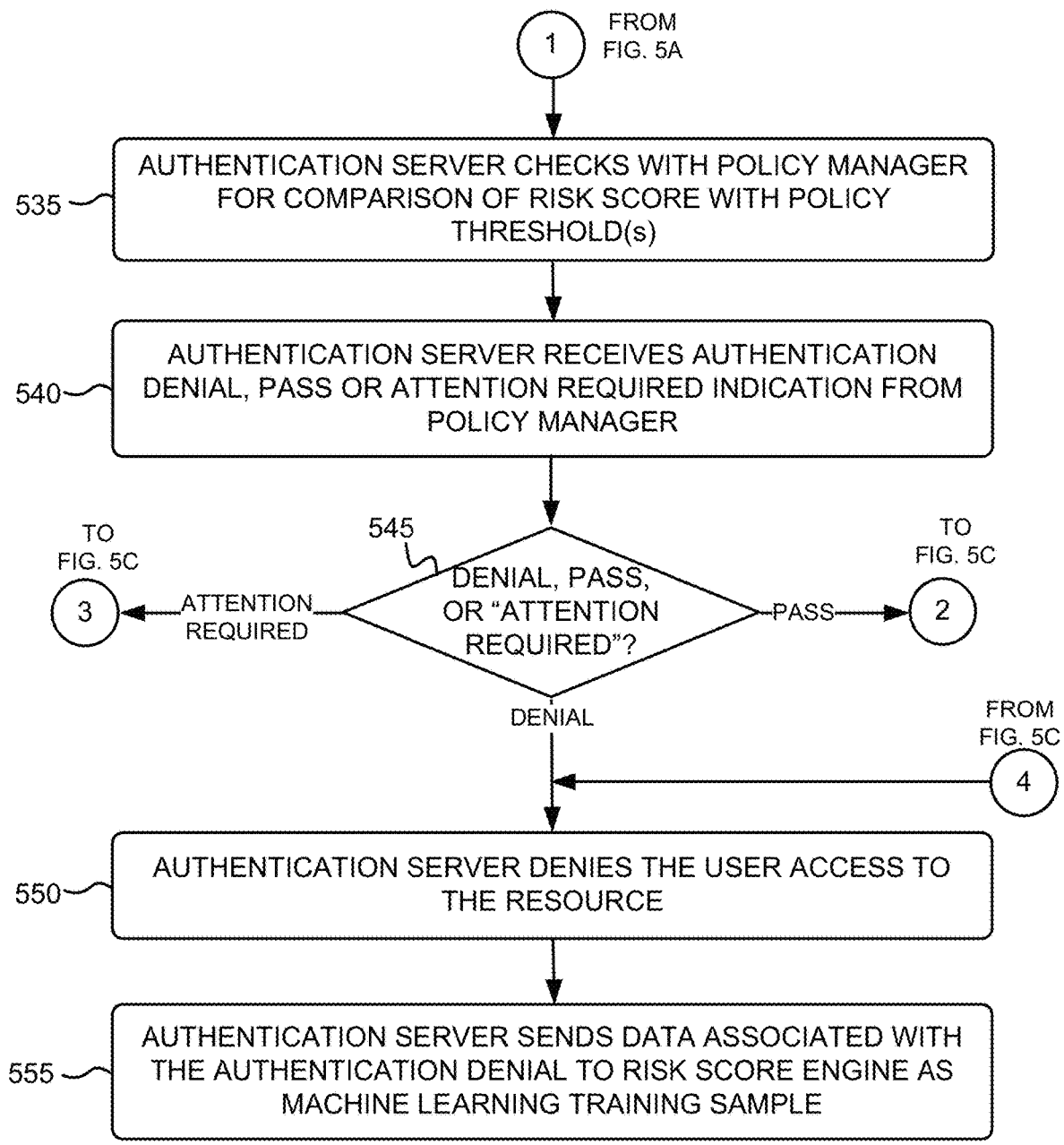
Figure 5C:
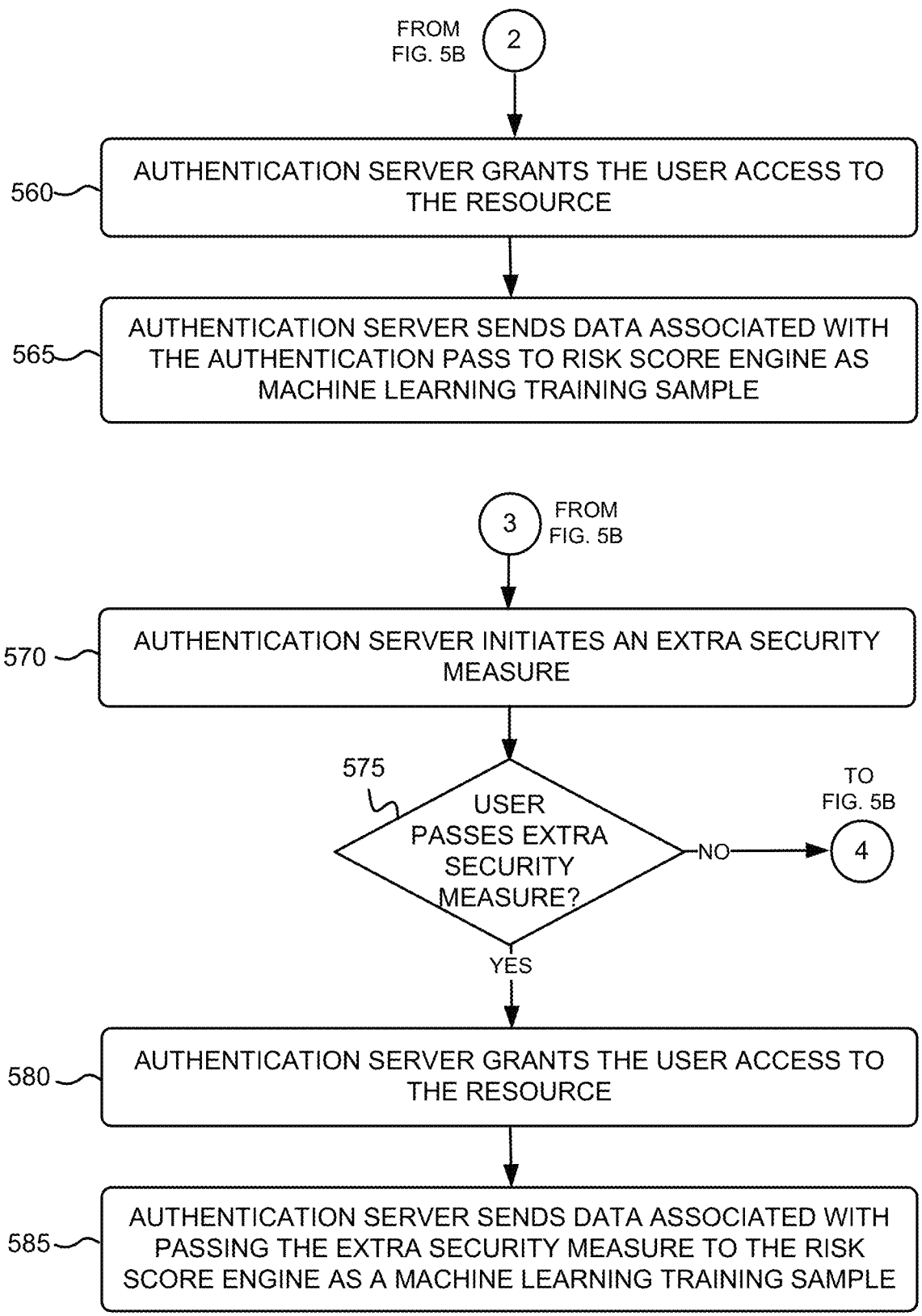

FIGS. 5A-5C are flow diagrams of an exemplary process for performing an assessment of identify fraud of a user 105 based on the user 105 engaging in one or more authentication processes for attempting to access a protected resource(s). The exemplary process of FIGS. 5A-5C may be executed by risk assessment platform 100. The exemplary process of FIGS. 5A-5C is described below with reference to the signaling/messaging/operations diagrams of FIGS. 6A and 6B.

Figure 6A:
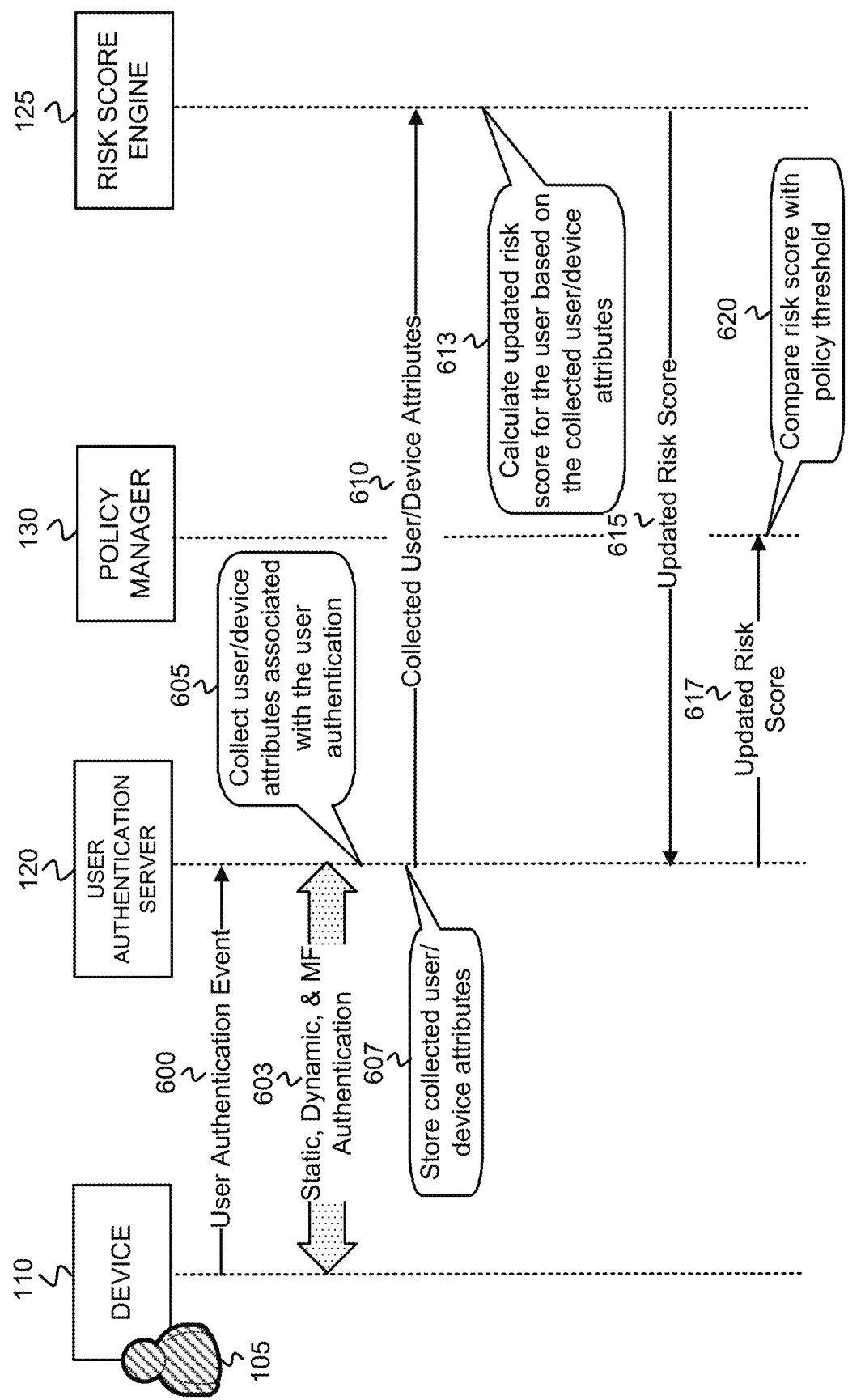
FIGS. 6A and 6B are messaging/operations diagrams associated with the exemplary process of FIGS. 5A-5C.

The exemplary process includes user authentication server 120 receiving an indication of a user authentication event associated with a user's attempt to access to a protected resource (block 500), and authentication server 120 conducting static, dynamic, and/or multi-factor authentication of the user 105 and the user's device 110 based on the user authentication event (block 505). The user 105, for example, may attempt, using device 110 over network(s) 220, to access data stored by an app server 135, or to access a network service provided by app server 135, and user authentication server 120 may, upon notification of the authentication event, initiate a static, dynamic, and/or multi-factor authentication process to verify the identity of the user 105. FIG. 6A depicts authentication server 120 receiving a user authentication event 600 from device 110 and, in response, authentication server 120 initiating static, dynamic, and/or multi-factor authentication processes 603 for user 105 and device 110.

User authentication server 120 collects user/device attributes associated with the user authentication (block 510), and stores the collected user/device attributes in a database (block 515). The collected user/device attributes may include user, device and/or network attributes associated with the user 105, the user's device 110, or the network(s) 220 through which the user's device 110 is connected. The collected user/device attributes may include, but are not limited to, the user 105's name, the user's address, the user's phone number (e.g., MDN), the user's account information (e.g., account age, account number, account status, customer type, call forwarding indicator, account email address, account primary phone, billing address, service address, privacy settings, etc.), the user's device 110 information (e.g., Mobile Equipment Identifier (MEID), International Mobile Equipment Identity (IMEI), International Mobile Subscriber Identifier (IMSI), Subscriber Identity Module (SIM) ID, prepaid device, burner device), the user's personal information (e.g., date of birth, gender, height), a network location of device 110 (e.g., IP address of the user's device 110), biometric data of the user 105 (e.g., "selfie" picture taken of the user 105, a biometric scan of user's fingerprint), device usage information, device location (e.g., using GPS), payment information (e.g., payment method, payment method type, card owner name, card type, card number, card expiration data, account owner name, bank account routing number, bank account number), and device profile information (e.g., SIM change date, device change date, MDN change date, equipment status change date, device make/model, SIM swap, device swap, roaming, roaming country). FIG. 6A depicts authentication server 120 collecting 605 user/device attributes associated with the user authentication processes, and storing 607 the user/device attributes in a storage memory device (not shown).

User authentication server 120 sends the collected user/device attributes to risk score engine 125 (block 520), and risk score engine 125 determines an updated risk score for the user based on the collected user/device attributes (block 525) and sends the updated risk score to user authentication server 120 (block 530). Risk score engine 125 may, in some implementations, implement machine learning process 145 that can use a Bayesian computation set to calculate the risk score for the user 105. The calculation may include, in one implementation, calculating sums of weights corresponding to the collected attributes for a user authentication event i. Further details of one exemplary implementation of the updated risk score determination of block 525 is described below with respect to the exemplary process of FIG. 9. FIG. 6A depicts risk score engine 125 receiving the collected user/device attributes 610 from authentication server 120, and calculating 613 an updated risk score for the user 105 based on the collected user/device attributes. FIG. 6A further depicts risk score engine 125 sending the updated risk score 615 to authentication server 120.

User authentication server 120 checks with policy manager 130 for a comparison of the received updated risk score with a policy threshold(s) (block 535). The policy thresholds may be established by, for example, an operator or administrator of risk assessment platform 100. The policy threshold value may be a pre-set value that may be changed manually by the operator or administrator, or the policy threshold may be determined by an algorithm that adjusts the policy threshold value based on the varying risk environment. FIG. 6A depicts authentication server 120 sending an updated risk score 617 to policy manager 130 and, upon receipt, policy manager 130 comparing 620 the received risk score with a policy threshold(s).

Figure 6B:
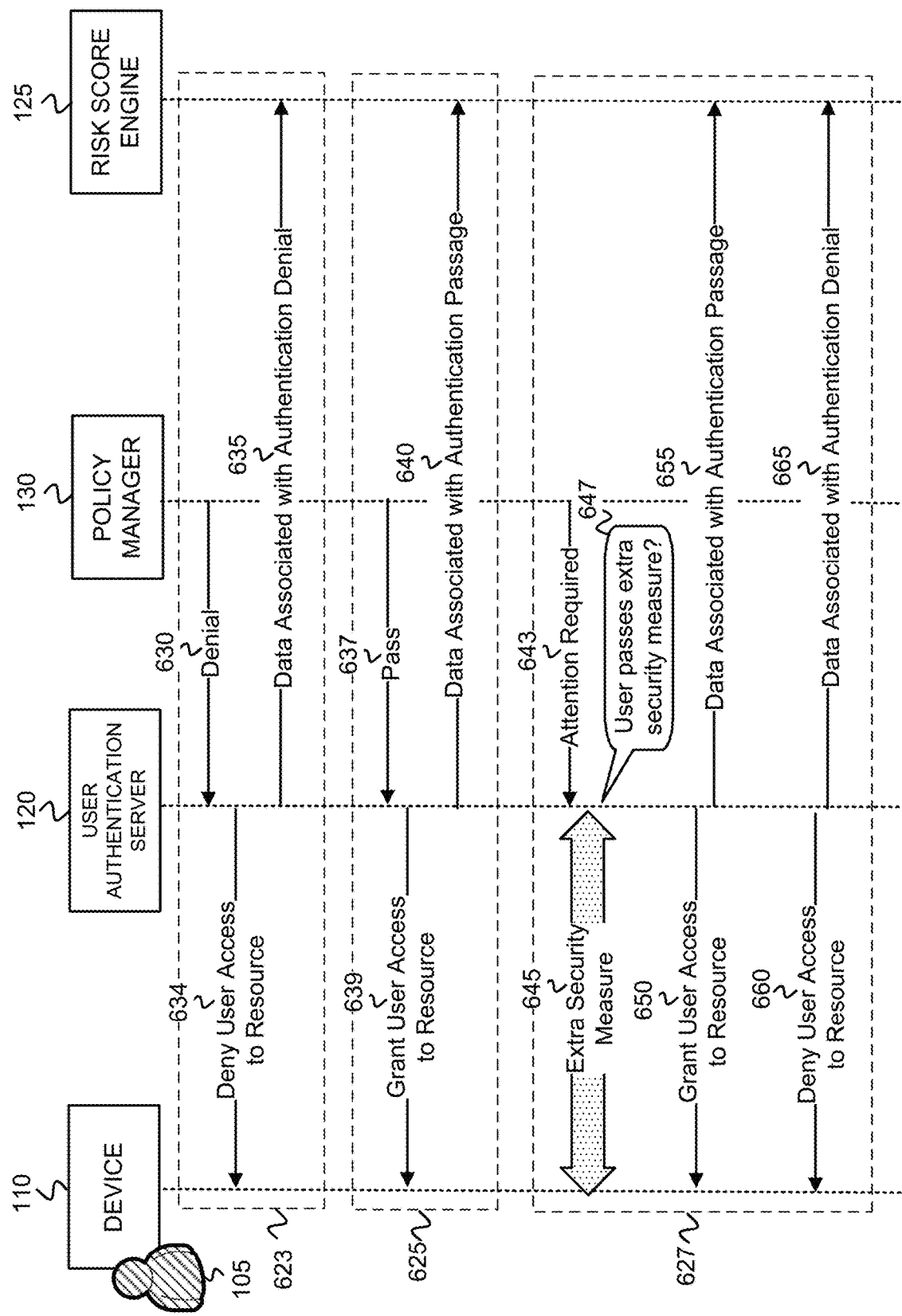

User authentication server 120 receives an authentication denial, passage, or "attention required" indication from policy manager 130 (block 540). If comparison of the updated risk score with the policy threshold indicates, for example, that the updated risk score is less than a first policy threshold (as an example, on a scale of 0-100, the first policy threshold may equal 40), then policy manager 130 may issue an authentication passage. If comparison of the updated risk score with the policy threshold indicates, for example, that the updated risk score is greater than a second policy threshold (as an example, on a scale of 0-100, the second policy threshold may equal 75) then policy manager 130 issue an authentication denial/failure. If comparison of the updated risk score with the policy threshold indicates, for example, that the updated risk score is between the first policy threshold and the second policy threshold, then policy manager 130 may issue an "attention required" notification. FIG. 6B depicts instances of authentication failure/denial 623, authentication passage 625, and "attention required" 627 performed by the policy manager 130 (as described in further detail below) based on the determined risk score for the user 105.

If the user authentication server 120 receives an authentication denial (DENIAL—block 545), then user authentication server 120 denies the user access to the resource (block 550), and sends data associated with the authentication denial to risk score engine 125 as a machine learning training sample (block 555). FIG. 6B depicts the instance of authentication denial 623, where policy manager 130 returns, based on the comparison of the risk score for user 105 to a policy threshold(s), an authentication denial 630 to authentication server 120. Upon receipt of the denial 630, authentication server 120 sends a message 634 that denies user access to the resource, and sends data 635 associated with the authentication denial to risk score engine 125 as a machine learning training sample.

Figure 7:
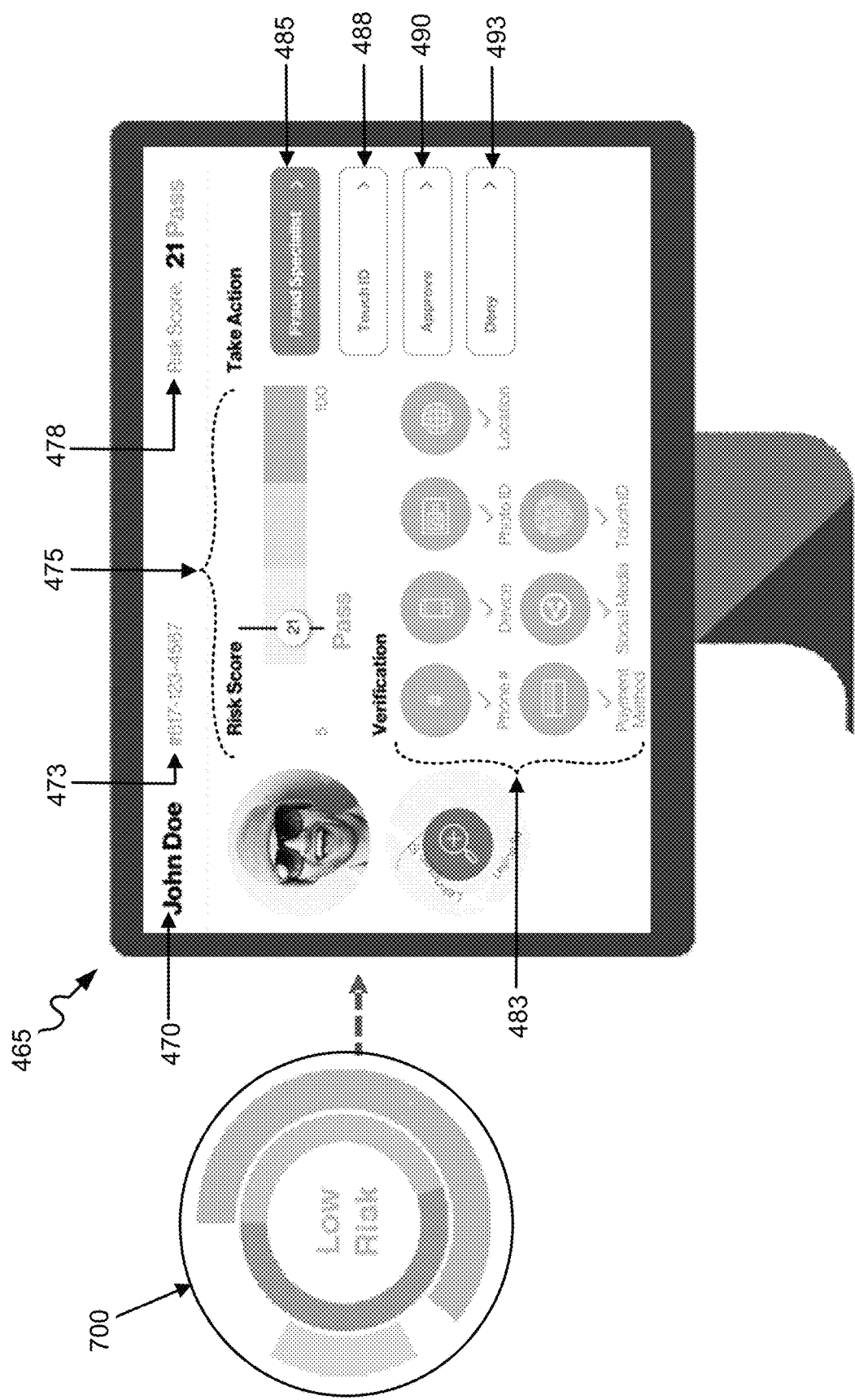
FIG. 7 depicts an example of the presentation of a determined low risk score associated with a user via the exemplary user interface of FIG. 4B.

If the user authentication server 120 receives an authentication passage indication (PASS—block 545), then user authentication server 120 grants the user access to the resource (block 560)(FIG. 5C), and sends data associated with the authentication pass to risk score engine 125 as a machine learning training sample (block 565). FIG. 7 shows an indication of low risk of identity fraud associated with a user 105 presented at the user interface 465 by risk assessment platform 100. In this example, risk score engine 125 determines a risk score of 21 for the user 105 identified by name 470, which policy manager 130 further determines as being sufficiently low to indicate a low level of risk of identity fraud for the user 105. FIG. 6B depicts the instance of authentication passage 625, where policy manager 130 returns, based on the comparison of the risk score for user 105 to a policy threshold(s), an authentication pass 637 indication to authentication server 120. Upon receipt of the pass indication 637, authentication server 120 sends a message 639 that grants user access to the resource, and sends data 640 associated with the authentication passage to risk score engine 125 as a machine learning training sample.

If the user authentication server 120 receives an "attention required" indication (ATTENTION REQUIRED—block 545), then user authentication server 120 initiates an extra security measure (block 570)(FIG. 5C). In one implementation, the extra security measure may include a "touch ID" or "push to verify" process by which risk assessment platform 100 initiates a pop-up window or message at the user 105's device 110 that requests the user 105 to push a button on the device 110 to verify receipt of the message. In this "touch ID" process, pushing of the button upon the user 105's device may, in itself, be used as a verification of the identity of user 105. In other implementations, when the button is pushed by the user 105 (e.g., with a particular finger) upon the device 110, a biometric scan of the user 105's fingerprint may be taken via a touch screen of the device 110. The scanned fingerprint may then be used for verification of the identity of the user 105 such as by comparison with a previously stored biometric scan of the user 105's fingerprint.

Figure 8A:
FIGS. 8A and 8B depict examples of touch screen displays associated with a touch identification process that verifies the identity of users.
Figure 8B:
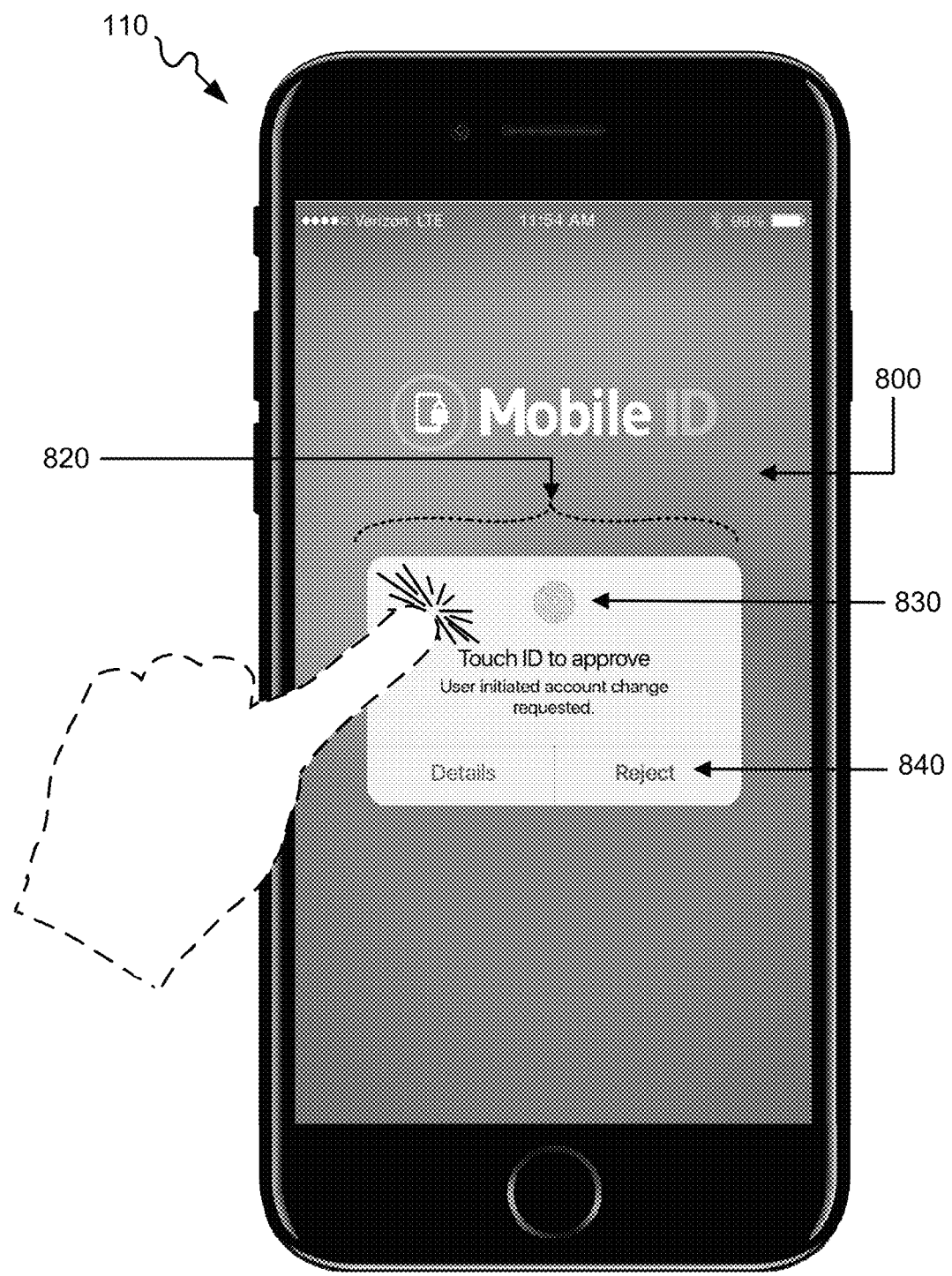

FIGS. 8A and 8B depict an example of a "touch ID" process performed at a device 110. As shown in FIG. 8A, a pop-up window 810 is displayed via a touch screen display 800 of device 110 in response to a request from risk assessment platform 100. Upon selection of the pop-up window 810 by the user 105 (e.g., touching the displayed window upon the touch screen display 800), a "touch ID"

window 820 is displayed via touch screen display 800 of device 110, as further shown in FIG. 8B. The user 105, using a finger, may reject the "touch ID" request by touching the "reject" button 840, or may accept the "touch ID" request by touching, using a particular finger (e.g., the index finger), a touch region 830 of the "touch ID" window 820.

In one implementation, upon touching of the touch region 830, signaling/messaging may be returned to risk assessment platform 100 notifying platform 100 that the user 105's identity has been confirmed. In another implementation, upon touching of the touch region 830, a biometric scan may be taken of the user 105's fingerprint, and the data associated with the scan may be returned to risk assessment platform 100 for comparison with previously stored biometric data. If the comparison indicates a match between the previously stored biometric fingerprint data and the current scanned data, then risk assessment platform 100 may conclude that the user 105's identity has been confirmed. FIG. 6B depicts the instance of "attention required" 627, where policy manager 130 returns, based on the comparison of the risk score for user 105 to a policy threshold(s), an "attention required" indication 643 to authentication server 120. Upon receipt of the "attention required" indication 643, authentication server 120 initiates an extra security measure 645, as shown in FIG. 6B. Other types of additional security measures, other than "touch ID," may be used in blocks 570 and 575.

If the user passes the extra security measure (YES—block 575), then user authentication server 120 grants the user access to the resource (block 580), and sends data associated with passing the extra security measure to risk score engine 125 as a machine learning training sample (block 585). Referring to the example "touch ID" process of FIGS. 8A and 8B, in one implementation, upon touching of the touch region 830, signaling/messaging may be returned to risk assessment platform 100 notifying platform 100 that the user 105's identity has been confirmed. In another implementation, upon touching of the touch region 830, a biometric scan may be taken of the user 105's fingerprint, and the data associated with the scan may be returned to risk assessment platform 100 for comparison with previously stored biometric data. If the comparison indicates a match between the previously stored biometric fingerprint data and the current scanned data, then risk assessment platform 100 may conclude that the user 105's identity has been confirmed. Once the user 105's identity has been confirmed, then authentication server 120 may grant the user access to the resource. FIG. 6B depicts authentication server determining 647 if the user 105 has passed the extra security measure, and if the user 105 successfully passes the extra security measure, authentication server 120 sends a message 650 that grants user access to the resource. As further shown in FIG. 6B, authentication server 120 sends the data 655 associated with the authentication passage to risk score engine 125 for use as a machine learning training sample.

If the user doesn't not pass the extra security measure (NO—block 575), then user authentication server 120 denies the user access to the resource (block 550), and sends data associated with the authentication denial to risk score engine 125 as a machine learning training sample (block 555). Referring again to the example "touch ID" process of FIGS. 8A and 8B, if the user rejects the identity confirmation at device 105, does not touch the touch region 830 of "touch ID" window 820 within some specified period of time (e.g., within 3 minutes), or the scanned fingerprint data does not match previously stored user biometric data, then authentication server 120 may conclude that that the user 105 has not successfully confirmed the user 105's identity, and authentication server 120 may deny the user 105 access to the resource. FIG. 6B depicts authentication server determining 647 if the user 105 has passed the extra security measure, and if the user 105 does not successfully pass the extra security measure, authentication server 120 sends a message 660 that denies the user 105 access to the resource. As further shown in FIG. 6B, authentication server 120 sends the data 665 associated with the authentication passage to risk score engine 125 for use as a machine learning training sample.

The exemplary process of FIGS. 5A-5C may be repeated at the occurrence of each user authentication event associated with a particular user 105 using a device 110 for attempting to access one or more protected resources. Each user authentication event may include an attempt by the user 105 to access a same protected resource, or to access different protected resources of multiple different protected resources. Risk assessment platform 100 may store, at each occurrence of block 515, a cumulative collection of user/device attributes associated with one or more (e.g., numerous) user authentication events for use in determining an updated risk score for the user 105. Therefore, multiple repeats of the process of FIGS. 5A-5C for multiple different user authentication events results in a cumulative collection of user/device attributes that are collected and stored at each occurrence of blocks 515 and 520 of the repeated processes.

Figure 9:
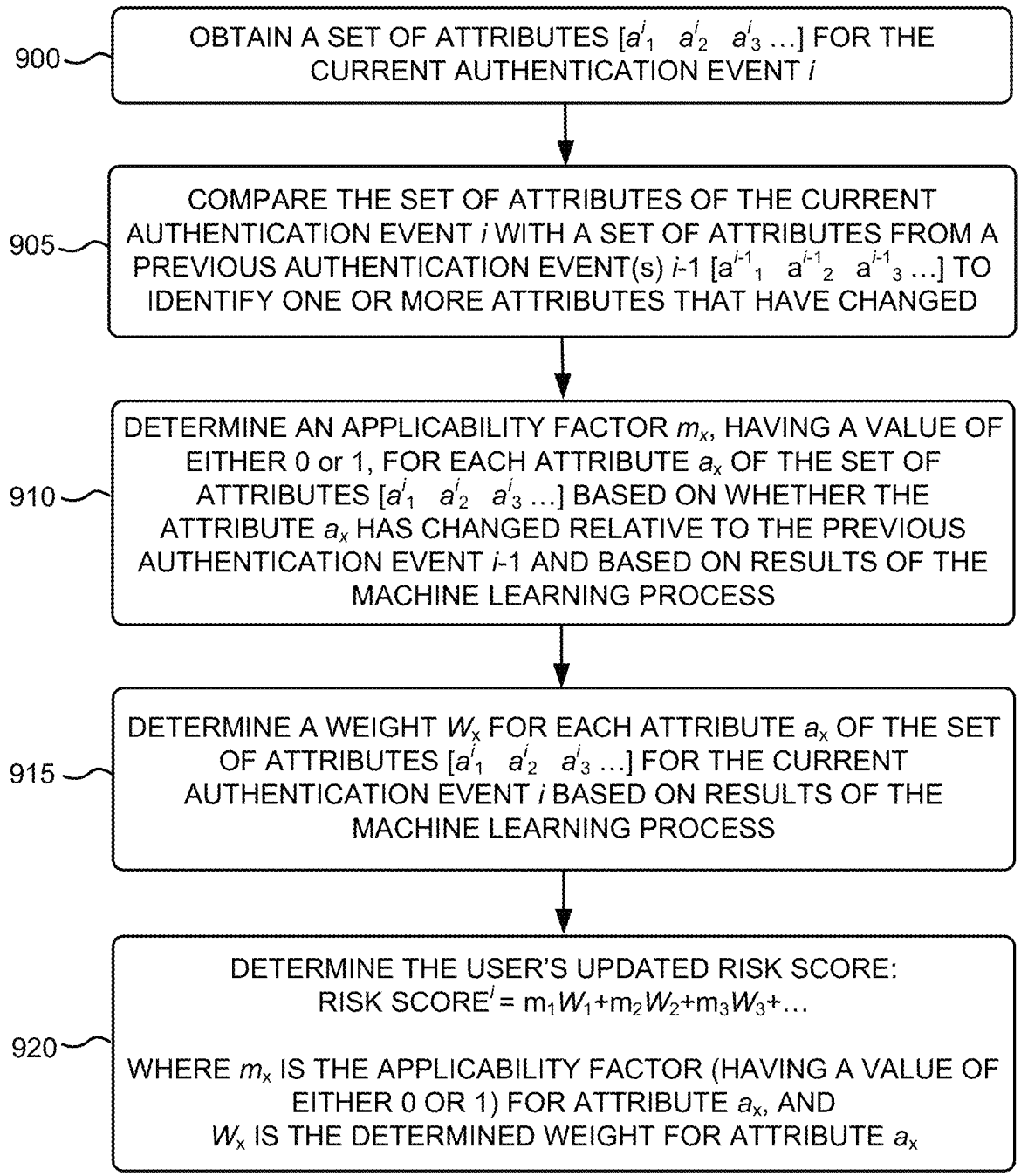
FIG. 9 is a flow diagram of an exemplary process for determining an updated risk score for a user based on collected user/device attributes.

FIG. 9 is a flow diagram of an exemplary process for determining an updated risk score for a user 105 based on collected user/device attributes. The exemplary process of FIG. 9, therefore, represents one exemplary implementation of block 525 of FIG. 5A. The exemplary process of FIG. 9 may be executed by risk score engine 125 of risk assessment platform 100.

The exemplary process includes risk score engine 125 obtaining a set of attributes [$a^i_1$ $a^i_2$ $a^i_3$ . . . ] for the current authentication event i (block 900). For each authentication event i, risk score engine 125 may receive a set of attributes that includes multiple different attributes $a^i_1$, $a^i_2$, $a^i_3$, etc. associated with the user 105 engaging in a static, dynamic or multi-factor authentication process. In a simplified example, the set of attributes may include four attributes: the user's physical location, the profile/settings of the user's account, a device profile of the user 105's device 110, and biometric data of the user 105. In this simplified example, the set of attributes [$a^i_1$ $a^i_2$ $a^i_3$ $a^i_4$] may equal (location$^i$, account profile$^i$, device profile$^i$, biometric$^i$) for authentication event i.

Risk score engine 125 compares the set of attributes of the current authentication event i with a set of attributes from a previous authentication event(s) i−1[$a^{i-1}_1$ $a^{i-1}_2$ $a^{i-1}_3$ . . . ] to identify one or more attributes that have changed (block 905). At one or more previous occurrences of an authentication event, risk score engine 125 may have received a corresponding set of attributes. Referring again to the simplified example, the set of previous attributes may include: the user's previous physical location, the previous account profile/settings of the user's account, the previous device profile of the user 105's device 110, and the previous biometric data of the user 105. Therefore, in the simplified example, the set of previous attributes [$a^{i-1}_1$ $a^{i-1}_2$ $a^{i-1}_3 a^{i-1}_4$] may equal (location$^{i-1}$, account profile$^{i-1}$, device profile$^{i-1}$, biometric$^{i-1}$) for authentication event i−1. In some implementations, instead of using the attribute set associated with the previous authentication event i−1, risk score engine 125 may perform a "look back" at the attribute set associated with the xth previous authentication event (i-x), or may perform a "look back" at all of the attribute sets between the current attribute set and the xth previous attribute set. Risk score engine 125 may compare any of the collected user behavior attributes, user information attributes, device information attributes, and network information attributes, such as those described above with respect to FIG. 1, between an authentication event and a previous authentication event to identify one or more attributes that have changed.

Risk score engine 125 determines an applicability factor $m_x$, having a value of either zero or one, for each attribute $a_x$ of the set of attributes $[a^i_1\ a^i_2\ a^i_3\ \ldots]$ based on whether the attribute $a_x$ has changed relative to the previous authentication event i-1 and based on results of the machine learning process 145 (block 910). Thus, an applicability factor $m_x$ for each attribute $a_x$ may be set either to zero or one depending on whether that attribute $a^i_x$ has changed relative to a previous event's attribute $a^{i-1}_x$, and also based on machine learning process 145. Referring to the simplified example, the current attribute set (location$^i$, account profile$^i$, device profile$^i$, biometric$^i$) is compared to the previous attribute set (location$^{i-1}$, account profile$^{i-1}$, device profile$^{i-1}$, biometric$^{i-1}$) to determine which attributes in the current set do not match corresponding attributes in the previous set.

For example, if the user 105's physical location at authentication event i does not match the user 105's physical location at authentication event i-1, then the applicability factor $m_1$ for the physical location attribute $a^i_1$ may be set to a value of one, and the applicability factors $m_x$ of other attributes, that have not changed, may be set to a value of zero. If, as another example, the user 105's account/settings profile at authentication event i additionally does not match the user 105's account/settings profile at authentication event i-1, then the applicability factor $m_2$ for the account profile attribute $a^i_2$ may be set to a value of one, and the applicability factors $m_x$ of other attributes, that have not changed, may be set to a value of zero. The results of machine learning process 145 may, however, be used to alter the applicability factors assigned to each attribute $a_x$ (e.g., an applicability factor of zero assigned to an attribute changed to one, an applicability factor of one assigned to an attribute changed to a zero). In one implementation, machine learning process 145 may use a Bayesian machine learning algorithm, that incorporates feedback from previous authentication events, to adjust the applicability factors $m_x$ for each attribute $a_x$ of the current attribute set.

Risk score engine 125 determines a weight W, for each attribute $a_x$ of the set of attributes $[a^i_1\ a^i_2\ a^i_3\ \ldots]$ for the current authentication event i based on results of the machine learning process (block 915). Thus, risk score engine 125 determines a weight $W_1$ for attribute $a_1$, a weight $W_2$ for attribute $a_2$, a weight $W_3$ for attribute $a_3$, etc. In one implementation, each weight $W_x$ for each attribute $a_x$ may be initially set by an administrator of risk assessment platform 100, with each weight $W_x$ being dynamically adjusted, over time, based on machine learning process 145. Returning to the simplified example, a weight ($W_1$) of 30 may be specified for the physical location attribute, a weight ($W_2$) of 20 may be specified for the account profile attribute, a weight ($W_3$) of 20 may be specified for the device profile attribute, and a weight ($W_4$) of 30 may be specified for the biometric data attribute.

Risk score engine 125 determines the user 105's updated risk score:

$$\text{RISK SCORE}^i = m_1 W_1 + m_2 W_2 + m_3 W_3 + \ldots \quad \text{Eqn. (1)}$$

where $m_x$ is the applicability factor (having a value of either 0 or 1, as determined in block 910) for attribute $a^i_x$, and $W_x$ is the determined weight (determined in block 915) for attribute $a^i_x$. Returning again to the simplified example, if the user 105's physical location (attribute $a^i_1$) at authentication event i does not match the user 105's physical location (attribute $a^{i-1}_1$) at authentication event i-1, and the user 105's account/settings profile (attribute $a^i_2$) at authentication event i additionally does not match the user 105's account/settings profile (attribute $a^{i-1}_2$) at authentication event i-1, then the applicability factor $m_1$ for the physical location attribute $a^i_1$ may be set to a value of one and the applicability factor $m_2$ for the account/settings profile attribute $a^i_2$ may be set to a value of one. Additionally, the applicability factor $m_3$ for the device profile attribute $a^i_3$, and the applicability factor $m_4$ for the biometric data attribute $a^i_4$, may be both set to zero. Therefore, with weights $[W_1\ W_2\ W_3\ W_4]$ being set (either by an administrator, or via dynamic adjustment by machine learning process 145) to [30 20 20 30], then the updated risk score may be calculated as $(1*30)+(1*20)+(0*20)+(0*30)=50$. Calculation of the updated risk score concludes the exemplary process of FIG. 9, which corresponds to block 525 of FIG. 5A.

Figure 10:
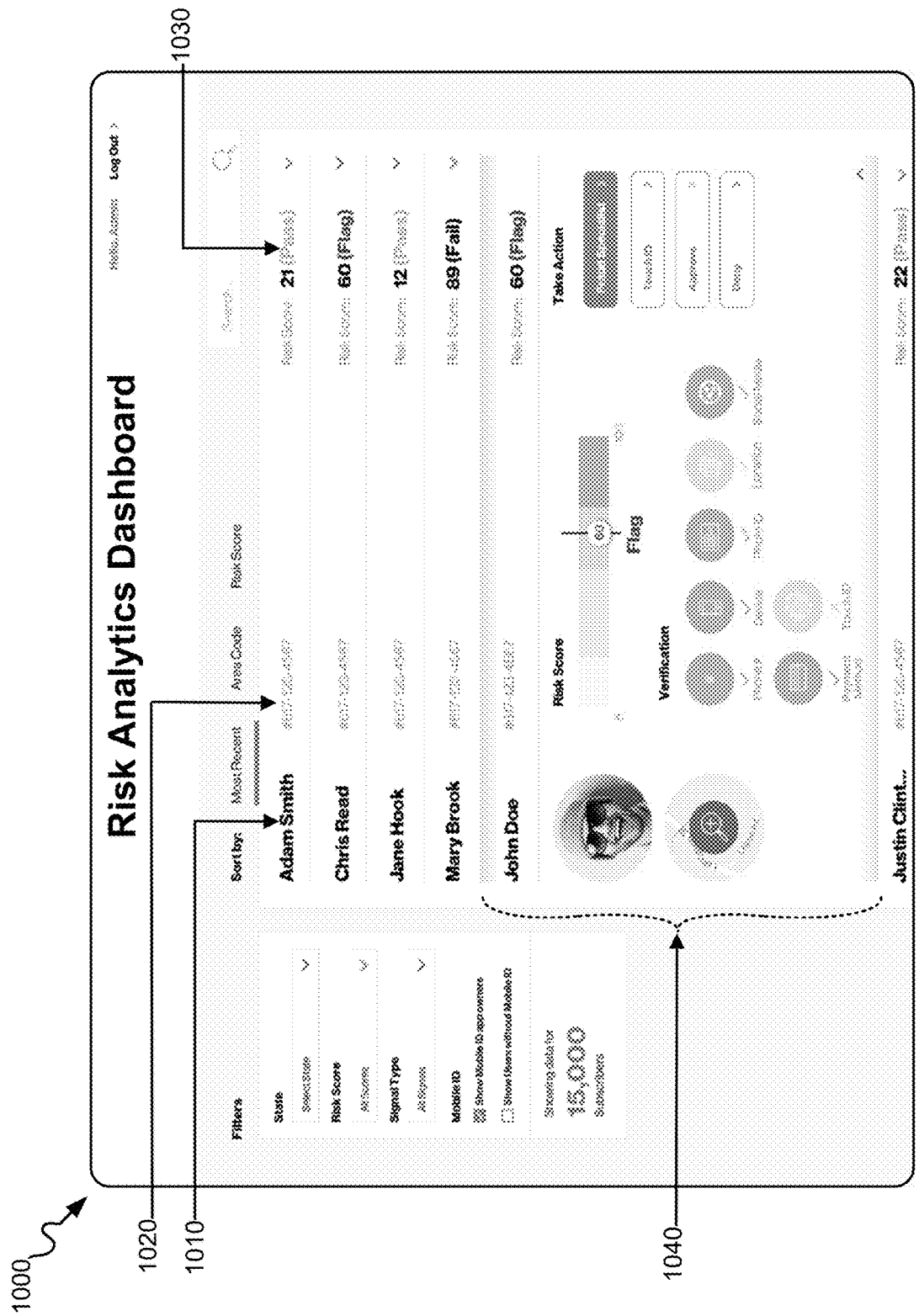
FIG. 10 depicts an exemplary user interface presented to an administrator/operator of the risk assessment platform of FIG. 1 for displaying user identification information, and determined risk scores, associated with multiple different users.

FIG. 10 depicts an exemplary "risk analytics dashboard" user interface 1000 that may be displayed at a device based on data obtained from risk assessment platform 100. User interface 1000 may provide, in easily accessible form, risk score information associated with multiple different users 105, where the risk score for each user 105 has been determined as described with respect to FIGS. 5A-5C and FIG. 9 above. As shown, user interface 1000 may display a list of user names 1010, a list of corresponding telephone numbers 1020, and a list of determined risk scores 1030, where each selectable line in user interface 1000 represents name, telephone number and risk score information for a different user 105 of multiple users. User interface 1000, therefore, enables an administrator/operator associated with risk assessment platform 100 to easily find and view a risk score determined for a particular user 105 among numerous different users. Upon finding a particular user 105, the administrator may select that user among the listed users in user interface 1000 to expand an information window 1040 that displays information that is the same as, or similar to, that already described with respect to FIG. 4B above. The administrator may, via a "take action" portion of the expanded information window 1040, refer the selected user 105 to a fraud specialist, initiate a "touch ID" process (described above with respect to FIGS. 8A and 8B), manually approve a resource access attempt by the user 105, or deny a resource access attempt by the user 105.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5A-5C, and FIG. 9, and operation/signaling/message flows with respect to FIGS. 1, 6A and 6B, the order of the blocks and/or operation/signaling/message flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such.

Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A risk assessment platform, comprising:
a communication interface connected to a network; and
a processing unit configured to:
receive, via the communication interface, an indication of a first user authentication event associated with a user's attempt to access a first protected resource;
collect, via the communication interface, first user and device attributes associated with a first authentication process applied to the user and the user's device;
receive, via the communication interface, an indication of a second user authentication event associated with the user's attempt to access a second protected resource;
collect, via the communication interface, second user and device attributes associated with a second authentication process applied to the user and the user's device;
determine, via the communication interface, a level of risk of identity fraud associated with the user based on first and second user and device attributes and based on a machine learning process, wherein, when determining the level of risk of identity fraud associated with the user, the processing unit is further configured to:
assign an applicability factor to each of the second user and device attributes, wherein the applicability factor has a first value of zero for a second user or device attribute when the second user or device attribute matches a corresponding first user or device attribute, and wherein the applicability factor has a second value of one for the second user or device attribute when the second user or device attribute does not match the corresponding first user or device attribute;
assign weight values to each of the second user and device attributes;
multiply the applicability factor by the assigned weight value for each of the second user and device attributes to produce a weighted applicability factor for each second user and device attributes;
add the weighted applicability factors to produce a sum; and
determine a risk score, that identifies the level of risk of identity fraud associated with the user, based on the sum;
grant or deny, via the communication interface, the user access to the second protected resource based on the determined level of risk of identity fraud associated with the user;
send, via the communication interface, first information regarding granting or denying the user access to the second protected resource to a risk score engine as a machine learning training sample; and
send, via the communication interface, second information regarding granting or denying the user access to the second protected resource to a device associated with a risk assessment operator for display on a risk assessment user interface of the device, wherein the risk assessment user interface displays options for the risk assessment operator to perform actions associated with granting or denying the user access to the second protected resource, referring the user to a fraud specialist, and initiating an additional user identity verification.

2. The risk assessment platform of claim 1, wherein the first user and device attributes comprise data associated with a behavior of the user, device information associated with the user's device, and network information associated with the user's access of a network via the user's device during the first authentication process.

3. The risk assessment platform of claim 2, wherein the second user and device attributes comprise data associated with a behavior of the user, device information associated with the user's device, and network information associated with the user's access of a network via the user's device during the second authentication process.

4. The risk assessment platform of claim 1, wherein the first and second authentication processes applied to the user and the user's device comprise static, dynamic or multi-factor authentication processes.

5. The risk assessment platform of claim 1, wherein, when granting or denying the user access to the second protected resource, the processing unit is further configured to:
determine a risk score, that identifies the level of risk of identity fraud associated with the user, based on the collected first and second user and device attributes;
compare the risk score to a policy threshold to produce a comparison result; and
grant or deny the user access to the second protected resource based on the comparison result.

6. The risk assessment platform of claim 1, wherein the processing unit is further configured to:
determine changes between the first user and device attributes and the second user and device attributes,
wherein determining the level of risk of identity fraud associated with the user is further based on the determined changes.

7. A non-transitory storage medium storing instructions executable by a network device, wherein the instructions comprise instructions to cause the network device to:
receive an indication of a first user authentication event associated with a user's attempt to access a first protected resource;

collect first user and device attributes associated with a first authentication process applied to the user and the user's device;

receive an indication of a second user authentication event associated with the user's attempt to access a second protected resource;

collect second user and device attributes associated with a second authentication process applied to the user and the user's device;

determine a level of risk of identity fraud associated with the user based on the first and second user and device attributes and based on a machine learning process, wherein the instructions to cause the network device to determine the level of risk of identity fraud associated with the user further comprise instructions to cause the network device to:

assign an applicability factor to each of the second user and device attributes, wherein the applicability factor has a first value of zero for a second user or device attribute when the second user or device attribute matches a corresponding first user or device attribute, and wherein the applicability factor has a second value of one for the second user or device attribute when the second user or device attribute does not match the corresponding first user or device attribute;

assign weight values to each of the second user and device attributes;

multiply the applicability factor by the assigned weight value for each of the second user and device attributes to produce a weighted applicability factor for each second user and device attributes;

add the weighted applicability factors to produce a sum; and determine a risk score, that identifies the level of risk of identity fraud associated with the user, based on the sum;

grant or deny the user access to the second protected resource based on the determined level of risk of identity fraud associated with the user;

send first information regarding granting or denying the user access to the second protected resource to a risk score engine as a machine learning training sample; and send second information regarding granting or denying the user access to the second protected resource to a device associated with a risk assessment operator for display on a risk assessment user interface of the device, wherein the risk assessment user interface displays options for an operator to perform actions associated with granting or denying the user access to the second protected resource, referring the user to a fraud specialist, and initiating an additional user identity verification.

8. The non-transitory storage medium of claim 7, wherein the first user and device attributes comprise data associated with a behavior of the user, device information associated with the user's device, and network information associated with the user's access of a network via the user's device during the first authentication process, and wherein the second user and device attributes comprise data associated with a behavior of the user, device information associated with the user's device, and network information associated with the user's access of a network via the user's device during the second authentication process.

9. The non-transitory storage medium of claim 7, wherein the instructions to cause the network device to grant or deny the user access to the second protected resource further comprise instructions to cause the network device to:

determine a risk score, that identifies the level of risk of identity fraud associated with the user, based on the collected first and second user and device attributes;

compare the risk score to a policy threshold to produce a comparison result; and grant or deny the user access to the second protected resource based on the comparison result.

10. The non-transitory storage medium of claim 7, further comprising instructions to cause the network device to:

determine changes between the first user and device attributes and the second user and device attributes, wherein determining the level of risk of identity fraud associated with the user is further based on the determined changes.

11. The non-transitory storage medium of claim 7, wherein the first and second authentication processes applied to the user and the user's device comprise static, dynamic or multi-factor authentication processes.

12. A method, comprising:

receiving, at a risk assessment platform, an indication of a first user authentication event associated with a user's attempt to access a first protected resource;

collecting, by the risk assessment platform, first user and device attributes associated with a first authentication process applied to the user and the user's device;

receiving, at the risk assessment platform, an indication of a second user authentication event associated with the user's attempt to access a second protected resource;

collecting, by the risk assessment platform, second user and device attributes associated with a second authentication process applied to the user and the user's device;

determining, by the risk assessment platform, a level of risk of identity fraud associated with the user based on the first and second user and device attributes and based on a machine learning process, wherein determining the level of risk of identity fraud associated with the user comprises:

assigning an applicability factor to each of the second user and device attributes, wherein the applicability factor has a first value of zero for a second user or device attribute when the second user or device attribute matches a corresponding first user or device attribute, and wherein the applicability factor has a second value of one for the second user or device attribute when the second user or device attribute does not match the corresponding first user or device attribute;

assigning weight values to each of the second user and device attributes:

multiplying the applicability factor by the assigned weight value for each of the second user and device attributes to produce a weighted applicability factor for each second user and device attributes;

adding the weighted applicability factors to produce a sum; and determining a risk score, that identifies the level of risk of identity fraud associated with the user, based on the sum;

granting or denying, by the risk assessment platform, the user access to the second protected resource based on the determined level of risk of identity fraud associated with the user;

sending, by the risk assessment platform, first information regarding granting or denying the user access to the second protected resource to a risk score engine as a machine learning training sample; and sending, by the risk assessment platform, second information regarding granting or denying the user access to the second protected resource to a device associated with a risk assessment operator for display on a risk assessment user interface of the device, wherein the risk assessment user interface displays options for the risk assessment operator to perform actions associated with granting or denying the user access to the second protected resource, referring the user to a fraud specialist, and initiating an additional user identity verification.

13. The method of claim 12, wherein collecting the first user and device attributes comprises collecting data associated with a behavior of the user, device information associated with the user's device, and network information associated with the user's access of a network via the user's device during the first authentication process.

14. The method of claim 13, wherein collecting the second user and device attributes comprises collecting data associated with a behavior of the user, device information associated with the user's device, and network information associated with the user's access of a network via the user's device during the second authentication process.

15. The method of claim 12, wherein the first and second authentication processes applied to the user and the user's device comprise static, dynamic or multi-factor authentication processes.

16. The method of claim 12, wherein granting or denying the user access to the second protected resource comprises:

determining a risk score, that identifies the level of risk of identity fraud associated with the user, based on the collected first and second user and device attributes;

comparing the risk score to a policy threshold to produce a comparison result; and granting or denying the user access to the second protected resource based on the comparison result.

17. The method of claim 12, further comprising:

determining changes between the first user and device attributes and the second user and device attributes, wherein determining the level of risk of identity fraud associated with the user is further based on the determined changes.

18. The risk assessment platform of claim 1, wherein the weight values are adjusted over time based on the machine learning process.

19. The non-transitory storage medium of claim 7, wherein the weight values are adjusted over time based on the machine learning process.

20. The method of claim 12, wherein the weight values are adjusted over time based on the machine learning process.

* * * * *